United States Patent
Kurota

(10) Patent No.: US 10,754,237 B2
(45) Date of Patent: Aug. 25, 2020

(54) CONTROL APPARATUS, CONTROL METHOD, PROJECTION SYSTEM, AND STORAGE MEDIUM

(71) Applicant: CANON KABUSHIKI KAISHA, Tokyo (JP)

(72) Inventor: Masaru Kurota, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/405,597

(22) Filed: May 7, 2019

(65) Prior Publication Data

US 2019/0361332 A1    Nov. 28, 2019

(30) Foreign Application Priority Data

May 24, 2018   (JP) .................. 2018-100072
Feb. 26, 2019  (JP) .................. 2019-033294

(51) Int. Cl.
*G03B 21/20* (2006.01)
*H04N 9/31* (2006.01)
*G06F 3/0484* (2013.01)

(52) U.S. Cl.
CPC ........ *G03B 21/206* (2013.01); *G06F 3/0484* (2013.01); *H04N 9/3155* (2013.01)

(58) Field of Classification Search
CPC ............. G03B 21/147; G03B 21/206; G03B 21/2053; G03B 21/2055; G03B 21/2066
See application file for complete search history.

(56) References Cited

U.S. PATENT DOCUMENTS

| | | | |
|---|---|---|---|
| 2009/0091714 A1* | 4/2009 | Aufranc ............... | G03B 21/14 353/70 |
| 2014/0104582 A1* | 4/2014 | Mori .................... | H04N 9/3185 353/30 |
| 2016/0353068 A1* | 12/2016 | Ishikawa ............. | H04N 9/3147 |
| 2018/0253863 A1* | 9/2018 | Wallack ............... | G06T 7/80 |

FOREIGN PATENT DOCUMENTS

JP         2017-26832 A    2/2017

* cited by examiner

*Primary Examiner* — Sultan Chowdhury
(74) *Attorney, Agent, or Firm* — Canon U.S.A., Inc. IP Division

(57) ABSTRACT

A control apparatus for controlling a plurality of projection apparatuses each of which projects an image onto a projection surface includes a setting unit configured to set a control group including two or more projection apparatuses, a reception unit configured to receive an instruction relating to a direction in which to move projection areas of the two or more projection apparatuses included in the control group in the projection surface, and a control unit configured to, in response to the instruction, control the two or more projection apparatuses included in the control group in such a way as to move the projection areas of the two or more projection apparatuses in a direction corresponding to the instruction.

24 Claims, 23 Drawing Sheets

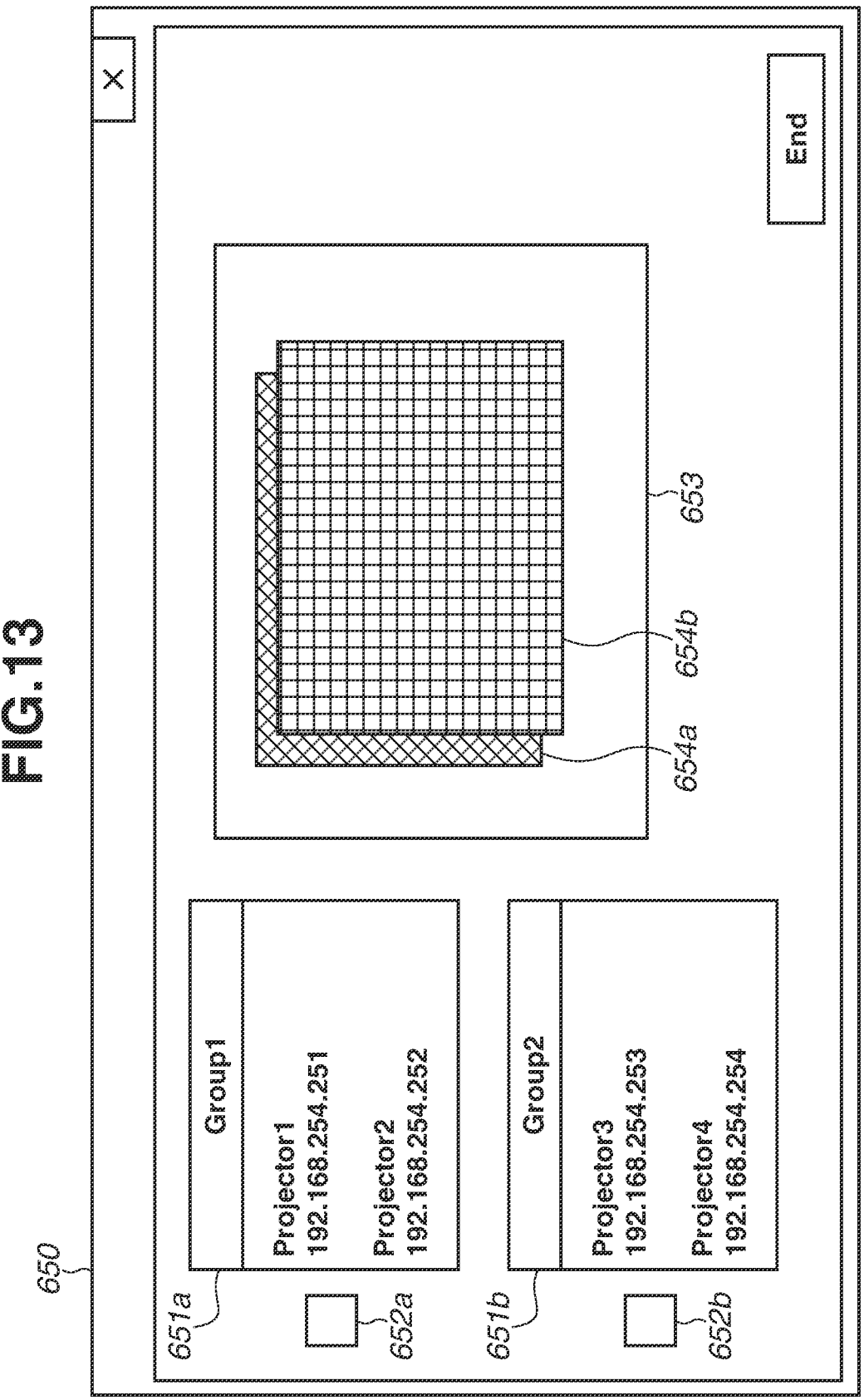

FIG.17

| COMBINATION OF TARGET PROJECTORS | GROUP INDEX (SUPERPOSITION DEGREE) | DISTANCE BETWEEN CENTRAL COORDINATES |
|---|---|---|
| (Projector1, Projector2) | 0.89 | 8.03 |
| (Projector1, Projector3) | 0.86 | 10.68 |
| (Projector1, Projector4) | 0.84 | 15.22 |
| (Projector2, Projector3) | 0.98 | 3.28 |
| (Projector2, Projector4) | 0.91 | 9.58 |
| (Projector3, Projector4) | 0.92 | 6.53 |

CONTROL APPARATUS, CONTROL METHOD, PROJECTION SYSTEM, AND STORAGE MEDIUM

BACKGROUND

Field of the Disclosure

Aspects of the present disclosure generally relate to a control apparatus which controls projection positions of a plurality of projection apparatuses, a control method for the control apparatus, a projection system including the projection apparatuses and the control apparatus, and a storage medium storing a program for implementing projection control.

Description of the Related Art

There is a projection method of combining, on a projection surface, projection images projected by a plurality of projectors (projection apparatuses), thus displaying an image. In the case of projecting images in such a projection method, it is necessary to previously adjust the projection positions of the respective projection apparatuses.

Japanese Patent Application Laid-Open No. 2017-26832 discusses a display system which performs tiling projection with use of a plurality of projectors connected to a network. The display system displays an image in which group information and identification information about each of a plurality of projectors selectable and connected to a network are associated with each other. This makes it easy for the user to discriminate a projector for which group information is previously set while being assumed to be used for tiling projection from the other projectors connected to the network.

Out of methods of projecting images with a plurality of projection apparatuses, stack projection, which displays an image by stacking projection images projected from the respective projection apparatuses, involves implementation of previously adjusting the projection positions of the respective projection apparatuses in such a manner that the projection positions of the plurality of projection apparatuses are superposed on each other. There is a control application which, to adjust the projection positions of the respective projection apparatuses, performs image capturing of projection images projected by the respective projection apparatuses and thus automatically adjusts the projection positions. In a case where the projection positions are controlled with use of such an automatic control application, a minute deviation may sometimes occur in the projection positions due to external factors present during adjustment or after adjustment.

SUMMARY

According to one or more aspects of the present disclosure, a control apparatus for controlling a plurality of projection apparatuses each of which projects an image onto a projection surface includes a setting unit configured to set a control group including two or more projection apparatuses, a reception unit configured to receive an instruction relating to a direction in which to move projection areas of the two or more projection apparatuses included in the control group in the projection surface, and a control unit configured to, in response to the instruction, control the two or more projection apparatuses included in the control group in such a way as to move the projection areas of the two or more projection apparatuses in a direction corresponding to the instruction.

Further features of the present disclosure will become apparent from the following description of exemplary embodiments with reference to the attached drawings.

BRIEF DESCRIPTION OF THE DRAWINGS

FIG. 13 is a fifth schematic diagram illustrating a GUI which is displayed on the display unit.

FIG. 17 is a table showing a superposition degree (group index) between each combination of target projectors and a distance between central coordinates of projection areas thereof.

DESCRIPTION OF THE EMBODIMENTS

Various exemplary embodiments, features, and aspects of the disclosure will be described in detail below with reference to the drawings, but the present disclosure is not limited to the following exemplary embodiments. Moreover, the exemplary embodiments of the disclosure represent merely examples of favorable configurations of the disclosure, and should not be construed to limit the scope of the disclosure.

Figure 1:
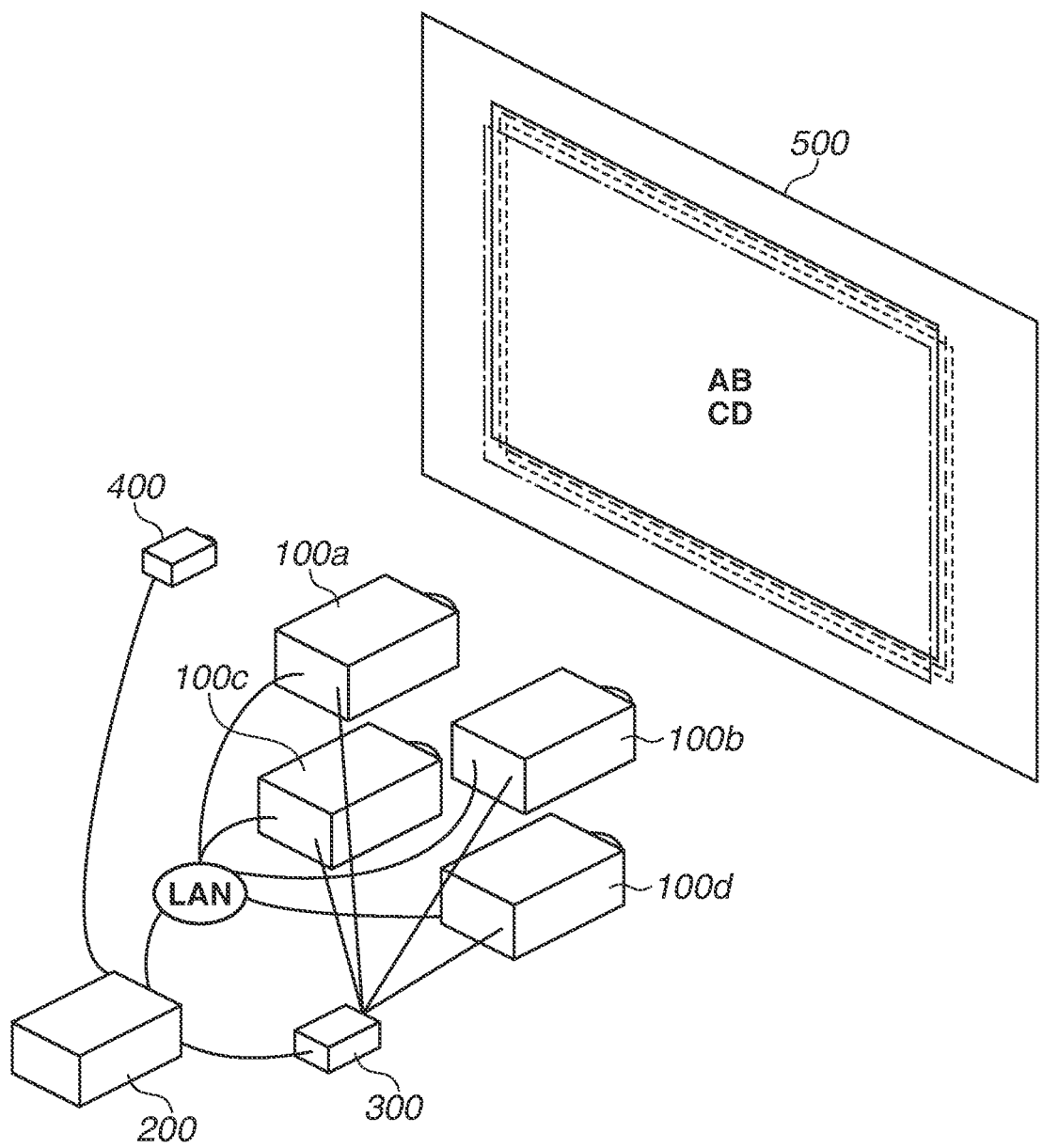
FIG. 1 is a diagram illustrating an example of a configuration of a projection system.

FIG. 1 is a diagram illustrating an example of a configuration of a projection system according to an exemplary embodiment of the disclosure. The projection system includes projectors 100a, 100b, 100c, and 100d, a projection control apparatus 200, a video distributor 300, and an imaging apparatus 400. The projection system is a multi-projection system which projects one image obtained by combining projection images projected from the projectors 100a, 100b, 100c, and 100d.

The projector 100a is a projection apparatus which projects a projection image A onto a projection surface 500. The projector 100b is a projection apparatus which projects a projection image B onto the projection surface 500. The projector 100c is a projection apparatus which projects a projection image C onto the projection surface 500. The projector 100d is a projection apparatus which projects a projection image D onto the projection surface 500. Hereinafter, in a case where each projector is individually referred to, the respective projectors are assigned the reference characters "100a", "100b", "100c", and "100d". Moreover, in a case where a common configuration or processing in the projectors is referred to, each projector is denoted as a "projector 100".

The projectors 100a to 100d are assumed to be previously installed so as to perform stack projection, which projects projection images A to D onto the projection surface 500 in a stacking manner. However, it is difficult to adjust the positions of the projection areas of the respective projectors on a pixel basis by the confirmation of the positions of the projection areas with the user's visual observation and the adjustment of the installation positions with the user's manual operation. In the present exemplary embodiment, the control of the position of a projection area for adjusting the projection area of each projector on a pixel basis is performed by position adjustment processing by the projection control apparatus 200.

The projection control apparatus 200 is assumed to be a control computer which is connected to the projectors 100a to 100d via a network and which controls the projectors 100a to 100d. The projection control apparatus 200 is assumed to be a notebook personal computer (PC) equipped with a display unit and an operation unit. Each projector included in the projection system is connected to the projection control apparatus 200 in such a way as to be able to communicate with each other. In the present exemplary embodiment, communications between the projector 100 and the projection control apparatus 200 are assumed to be performed via a local area network (LAN) in which Transmission Control Protocol/Internet Protocol (TCP/IP) is used as a communication protocol.

Furthermore, the projection control apparatus 200 to be used can be another type of information processing apparatus, such as a smartphone or a tablet. The communication between the projector 100 and the projection control apparatus 200 can be a wired communication or a wireless communication, and, moreover, there is no specific restriction on the communication protocol. Moreover, the projection control apparatus 200 is able to control operations of the projectors 100a to 100d by transmitting predetermined commands to the projectors 100a to 100d. The projectors 100a to 100d perform operations corresponding to the commands received from the projection control apparatus 200, and transmit results of the operations to the projection control apparatus 200.

The video distributor 300 duplicates a video signal received from the projection control apparatus 200, and supplies the duplicated video signals to the respective projectors 100a to 100d.

The imaging apparatus 400 is a camera which captures an image of the region of the projection surface 500 including the projection images A to D projected by the respective projectors 100a to 100d and outputs the captured image to the projection control apparatus 200. The imaging apparatus 400 is, for example, a digital camera, a web camera, or a network camera. Alternatively, the imaging apparatus 400 can be incorporated in the projection control apparatus 200. In a case where the imaging apparatus 400 is an apparatus different from the projection control apparatus 200 (an imaging apparatus outside the projection control apparatus 200), the imaging apparatus 400 is connected directly or via a network to the projection control apparatus 200 in such a way as to be able to communicate with each other. The projection control apparatus 200 is able to control an operation of the imaging apparatus 400 by transmitting a predetermined command to the imaging apparatus 400. For example, the imaging apparatus 400 performs image capturing of the projection surface 500 in response to a request from the projection control apparatus 200, and is thus able to transmit the obtained image data (the captured image) to the projection control apparatus 200.

Figure 2:
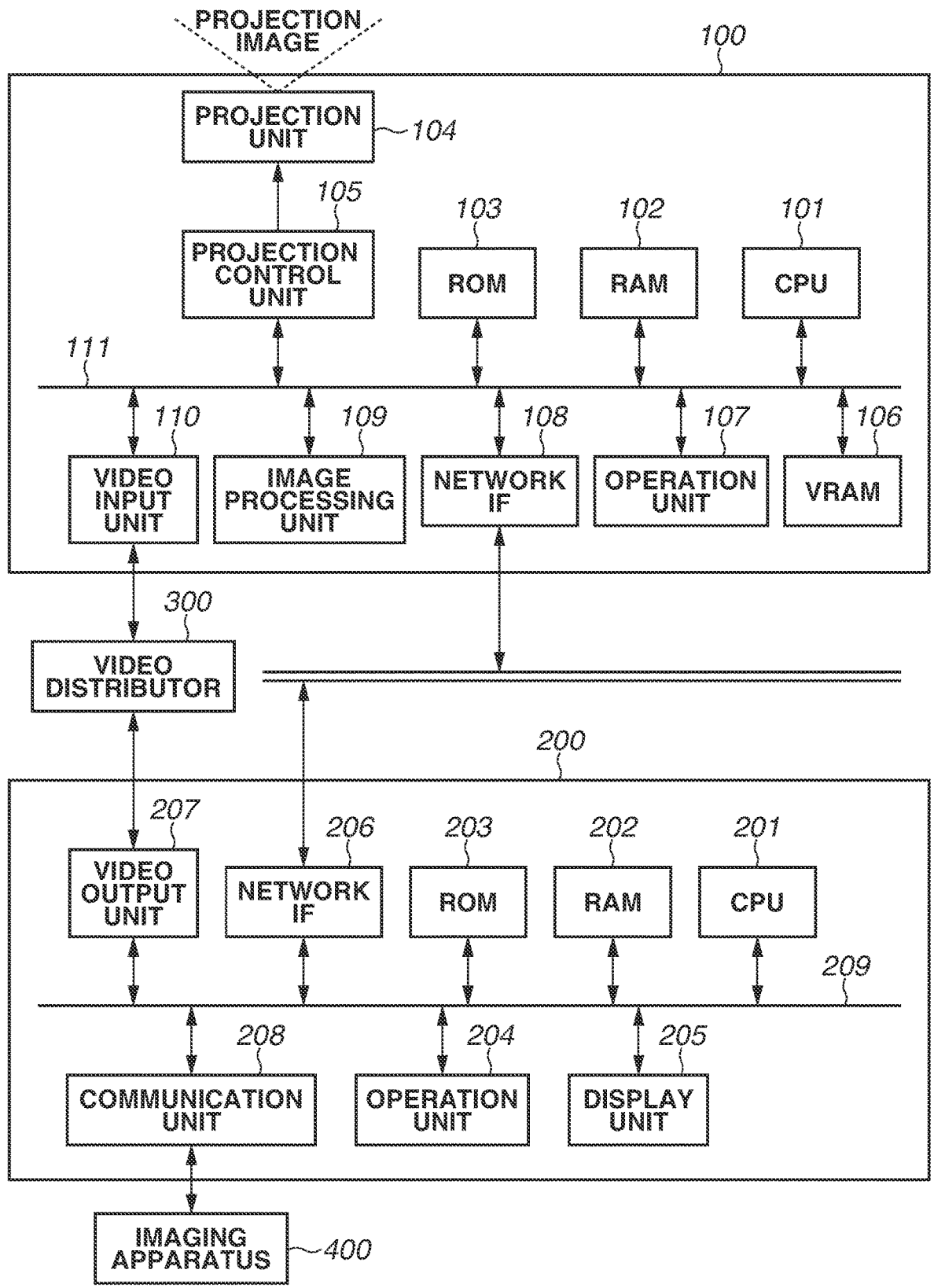
FIG. 2 is a block diagram illustrating functional blocks of a projector and a projection control apparatus.

FIG. 2 is a block diagram illustrating functional blocks of the projector 100 and the projection control apparatus 200, which are included in the projection system. The projector 100 includes a central processing unit (CPU) 101, a random access memory (RAM) 102, a read-only memory (ROM) 103, a projection unit 104, a projection control unit 105, a video RAM (VRAM) 106, an operation unit 107, a network interface (IF) 108, an image processing unit 109, and a video input unit 110. These functional blocks are interconnected via an internal bus 111 in such a way as to be able to communicate with each other.

The CPU 101, which may include one or more processors, one or more memories, circuitry, or a combination thereof, may operate as a control processor which may perform control of the functional blocks of the projector 100. The CPU 101 is assumed to be a programmable processor which implements the operation of the projector 100 by loading a program stored in the ROM 103 onto the RAM 102 and executing the program.

The RAM 102 is a storage medium which is used as a work memory when the CPU 101 executes the program. The RAM 102 has, stored therein, a program and, for example, variables used to execute the program. Moreover, the RAM 102 can also be used for another use application (for example, as a data buffer).

The ROM 103 is a storage medium in which, for example, programs which the CPU 101 executes and various setting values such as graphical user interface (GUI) data used to display, for example, a menu screen are stored. The ROM 103 can be a rewritable medium.

The projection unit 104 includes, for example, a light source and a projection optical system, and projects an optical image based on an image for projection supplied from the projection control unit 105. In the present exemplary embodiment, the projection unit 104 includes a liquid crystal panel serving as an optical modulation element, and controls the reflectance or transmittance for light from the light source according to the image for projection, thus generating an optical image that is based on the image for projection and then projecting the optical image onto the projection surface via the projection optical system.

The projection control unit 105 supplies, to the projection unit 104, data about an image for projection supplied from the image processing unit 109.

The VRAM 106 is a video memory which stores data about an image for projection received from an external (for example, a PC or media player).

The operation unit 107 includes input devices, such as key buttons, switches, and a touch panel, and receives an instruction issued by the user to the projector 100. The CPU 101 monitors an operation on the operation unit 107, and, when detecting an operation on the operation unit 107, performs processing corresponding to the detected operation. Furthermore, in a case where the projector 100 includes a remote controller, the operation unit 107 communicates an operation signal received from the remote controller to the CPU 101.

The network IF 108 is an interface which connects the projector 100 to a communication network, and has a configuration compliant with the standard of a communication network which the network IF 108 supports. In the present exemplary embodiment, the projector 100 is connected to a local network which is in common with the projection control apparatus 200 via the network IF 108. Accordingly, communications between the projector 100 and the projection control apparatus 200 are performed via the network IF 108.

The image processing unit 109 applies, as needed, various image processing operations to a video signal supplied to the video input unit 110 and stored in the VRAM 106, and supplies the processed video signal to the projection control unit 105. The image processing unit 109 can be, for example, a microprocessor for image processing. Alternatively, the function corresponding to the image processing unit 109 can be implemented by the CPU 101 executing a program stored in the ROM 103.

The image processing operations which the image processing unit 109 is able to apply include, for example, frame thinning processing, frame interpolation processing, resolution conversion processing, processing for superimposing an on-screen display (OSD), such as a menu screen, keystone correction processing, and edge blending processing, but are not limited to these.

The video input unit 110 is an interface which directly or indirectly receives a video signal output from an external apparatus (in the present exemplary embodiment, the projection control apparatus 200), and has a configuration corresponding to video signals which the video input unit 110 supports. The video input unit 110 includes, for example, one or more of a composite terminal, an S video terminal, a D terminal, a component terminal, analog RGB terminals, a DVI-I terminal, a DVI-D terminal, and an HDMI® terminal. Moreover, when receiving an analog video signal, the video input unit 110 converts the analog video signal into a digital video signal, and stores the digital video signal in the VRAM 106.

Next, a functional configuration of the projection control apparatus 200 is described. The projection control apparatus 200 can be a general-purpose computer to which an external display is connectable, and thus has a functional configuration equivalent to a general-purpose computer. The projection control apparatus 200 includes a CPU 201, a RAM 202, a ROM 203, an operation unit 204, a display unit 205, a network IF 206, a video output unit 207, and a communication unit 208. Moreover, these functional blocks are interconnected via an internal bus 209 in such a way as to be able to communicate with each other.

The CPU 201 is an example of a programmable processor, and implements the operation of the projection control apparatus 200 by loading a program (an operating system (OS) or an application program) stored in the ROM 203 onto the RAM 202 and executing the program.

The RAM 202 is used as a work memory when the CPU 201 executes the program. The RAM 202 has, stored therein, a program and, for example, variables used to execute the program. Moreover, the RAM 202 can also be used for another use application (for example, as a data buffer).

The ROM 203 can be a rewritable medium. The ROM 203 has, stored therein, for example, programs which the CPU 201 executes, GUI data used to display, for example, a menu screen, and various setting values. Furthermore, the projection control apparatus 200 can include a storage device (a hard disk drive (HDD) or a solid state drive (SSD)) having a capacity larger than that of the ROM 203, and, in this case, a large-volume program, such as an OS or an application program, can be stored in the storage device.

The operation unit 204 includes input devices, such as a keyboard, a pointing device (for example, a mouse), a touch panel, and switches, and receives an instruction issued by the user to the projection control apparatus 200. Furthermore, the keyboard can be a software keyboard. The CPU 201 monitors an operation on the operation unit 204, and, when detecting an operation on the operation unit 204, performs processing corresponding to the detected operation.

The display unit 205 is, for example, a liquid crystal panel or an organic electroluminescence (EL) panel. The display unit 205 performs displaying of screens which the OS or the application program supplies. Furthermore, the display unit 205 can be an external device. Moreover, the display unit 205 can be a touch display.

The network IF 206 is an interface which connects the projection control apparatus 200 to a communication network, and has a configuration compliant with the standard of a communication network which the network IF 206 supports. In the present exemplary embodiment, the projection control apparatus 200 is connected to a local network which is in common with the projector 100 via the network IF 206. Accordingly, communications between the projection control apparatus 200 and the projector 100 are performed via the network IF 206.

The video output unit 207 is an interface which transmits a video signal to an external apparatus (in the present exemplary embodiment, the projector 100 or the video distributor 300), and has a configuration corresponding to video signals which the video output unit 207 supports. The video output unit 207 includes, for example, one or more of a composite terminal, an S video terminal, a D terminal, a component terminal, analog RGB terminals, a DVI-I terminal, a DVI-D terminal, and an HDMI® terminal.

Furthermore, while, in the present exemplary embodiment, a user interface (UI) screen for a projection control application program having the adjustment function for a projection area of the projector 100 is assumed to be displayed on the display unit 205, the UI screen can be displayed on an external device connected to the video output unit 207.

The communication unit 208 is a communication interface for performing, for example, serial communication with an external apparatus, and is typically a Universal Serial Bus (USB) interface but can have a configuration compliant with another standard, such as RS-232C. While, in the present exemplary embodiment, the imaging apparatus 400 is assumed to be connected to the communication unit 208, there is no particular limit to the method of communication between the imaging apparatus 400 and the projection control apparatus 200, so that communications compliant with any standard which both the imaging apparatus 400 and the projection control apparatus 200 support can be performed.

Next, keystone correction is described. Keystone correction is correction (geometric correction) which geometrically transforms (deforms) an original image in such a way as to cancel trapezoidal distortion which occurs in a projection image according to a deviation between the normal line direction of a projection surface and a projection direction (generally, the optical axis of a projection optical system). Keystone correction is performed by the CPU 101 of the projector 100 according to an input instruction. Since geometric transformation of an image is able to be implemented by projective transformation, performing keystone correction is equal to determining a parameter (control parameter) of projective transformation, which is the amount of correction for geometric correction. For example, the CPU 101 can determine a parameter of projective transformation based on the amounts of movement and the directions of movement of the respective vertices of an original image of the rectangular shape, and provide the determined parameter to the image processing unit 109.

Figure 18:
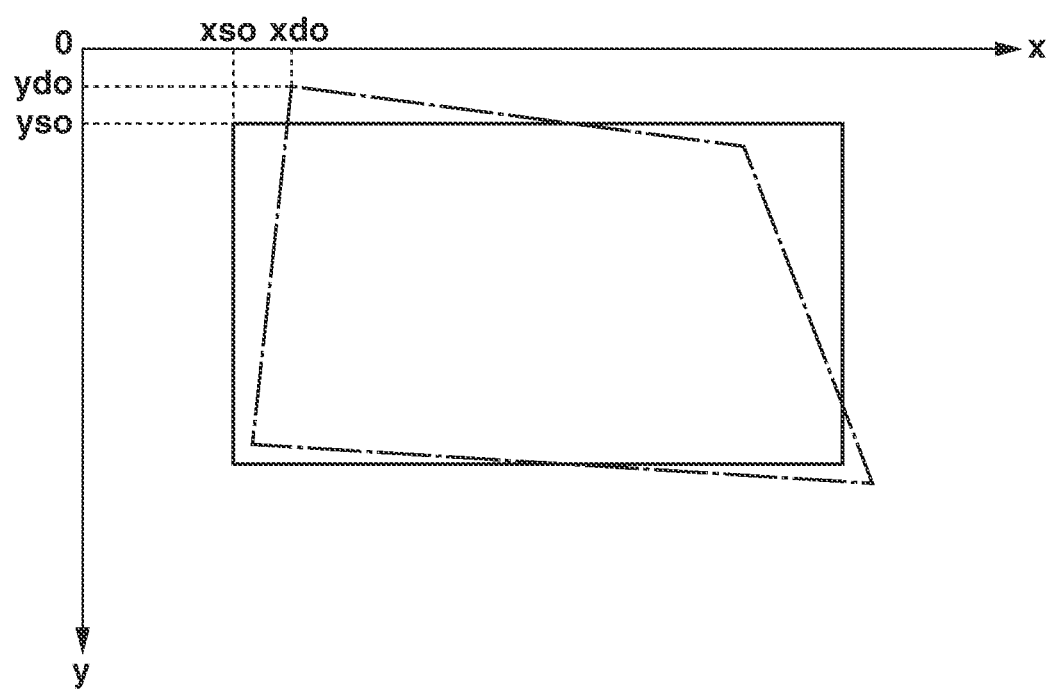
FIG. 18 is a schematic diagram illustrating projective transformation in keystone correction.

FIG. 18 is a schematic diagram illustrating projective transformation in keystone correction. For example, when the coordinates of an original image are denoted by (xs, ys), the coordinates (xd, yd) of an image transformed by projective transformation is expressed by the following formula (1).

$$\begin{pmatrix} x_d \\ y_d \\ 1 \end{pmatrix} = M \begin{pmatrix} x_s - x_{s0} \\ y_s - y_{s0} \\ 1 \end{pmatrix} + \begin{pmatrix} x_{d0} \\ y_{d0} \\ 0 \end{pmatrix} \qquad (1)$$

In formula (1), M is a three by three matrix and is a projective transformation matrix from the original image to the transformed image. Moreover, xso and yso are coordinates of the upper left vertex of the original image indicated by a solid line in FIG. 18, and xdo and ydo are coordinate values of a vertex corresponding to the vertex (xso, yso) of the original image in the transformed image indicated by a dashed-dotted line in FIG. 18.

The CPU 101 provides, as a parameter of keystone correction, the matrix M in formula (1) and an inverse matrix $M^{-1}$ thereof together with offsets (xso, yso) and (xdo, ydo) to the image processing unit 109. The image processing unit 109 is able to calculate the coordinates (xs, ys) of the original image corresponding to the coordinates (xd, yd) subjected to keystone correction according to the following formula (2).

$$\begin{pmatrix} xs \\ ys \\ 1 \end{pmatrix} = M^{-1} \begin{pmatrix} xd - xdo \\ yd - ydo \\ 1 \end{pmatrix} + \begin{pmatrix} xso \\ yso \\ 0 \end{pmatrix} \qquad (2)$$

If both of the coordinates xs and ys of the original image obtained in formula (2) are integers, the image processing unit 109 is able to set the pixel values of the original image coordinates (xs, ys) directly as the pixel values of the coordinates (xd, yd) of the image subjected to keystone correction. On the other hand, if the coordinates of the original image obtained in formula (2) do not become integers, the image processing unit 109 is able to calculate the pixel values equivalent to the original image coordinates (xs, ys) by interpolation computation using values of a plurality of surrounding pixels. The interpolation computation to be used includes, for example, any one of known interpolation computations, such as bilinear and bicubic. Furthermore, in a case where the coordinates of the original image obtained in formula (2) are coordinates of an area outside the original image, the image processing unit 109 sets the pixel values of the coordinates (xd, yd) of the image subjected to keystone correction to black (0) or a background color which the user has set. In this way, the image processing unit 109 calculates the pixel values of all of the coordinates of the image subjected to keystone correction, thus being able to produce a transformed image.

While, here, both the matrix M and the inverse matrix $M^{-1}$ thereof are supplied from the CPU 101 of the projector 100 to the image processing unit 109, only one of the matrices can be supplied and the other of the matrices can be calculated by the image processing unit 109.

Furthermore, the coordinates of vertices of the images subjected to keystone correction can be acquired by causing the user to input the amounts of movement via the operation unit 107 in such a manner that, for example, with respect to individual vertices of the projection image, the vertices are projected onto desired positions. In this case, to assist in inputting the amounts of movement, the CPU 201 can use the function of the projection control application program to cause the projector 100 to project a test pattern.

Accordingly, the projector 100, which has obtained the amount of keystone deformation, becomes able to move or deform the shape of the projection area to a desired position.

Figure 3:
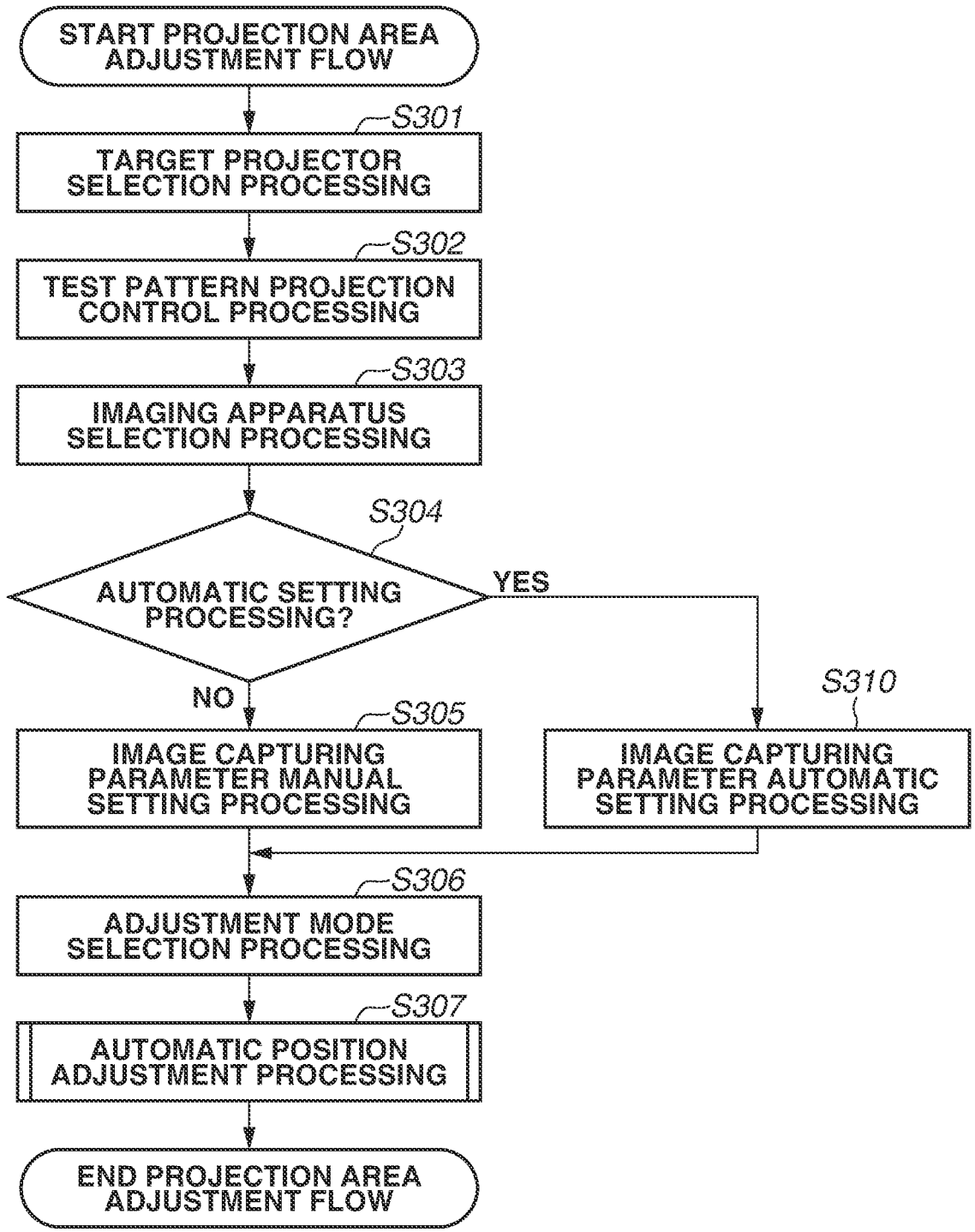
FIG. 3 is a flowchart illustrating a projection area adjustment flow.

Next, an adjustment flow for a projection area, which is performed by the projection control apparatus 200, is described. The flow of adjusting the position of a projection area of the projection apparatus is performed by the projection control apparatus 200 executing the projection control application program. FIG. 3 is a flowchart illustrating a projection area adjustment flow.

In step S301, the CPU 201 of the projection control apparatus 200 performs target projector selection processing for selecting a plurality of projectors targeted for adjustment of the projection area from among the projectors 100 with which the projection control apparatus 200 is able to communicate. The target projector selection processing includes processing for detecting connection projectors connected to the projection control apparatus 200 via a network, processing for displaying the connection projectors, and processing for determining target projectors.

Figure 4:
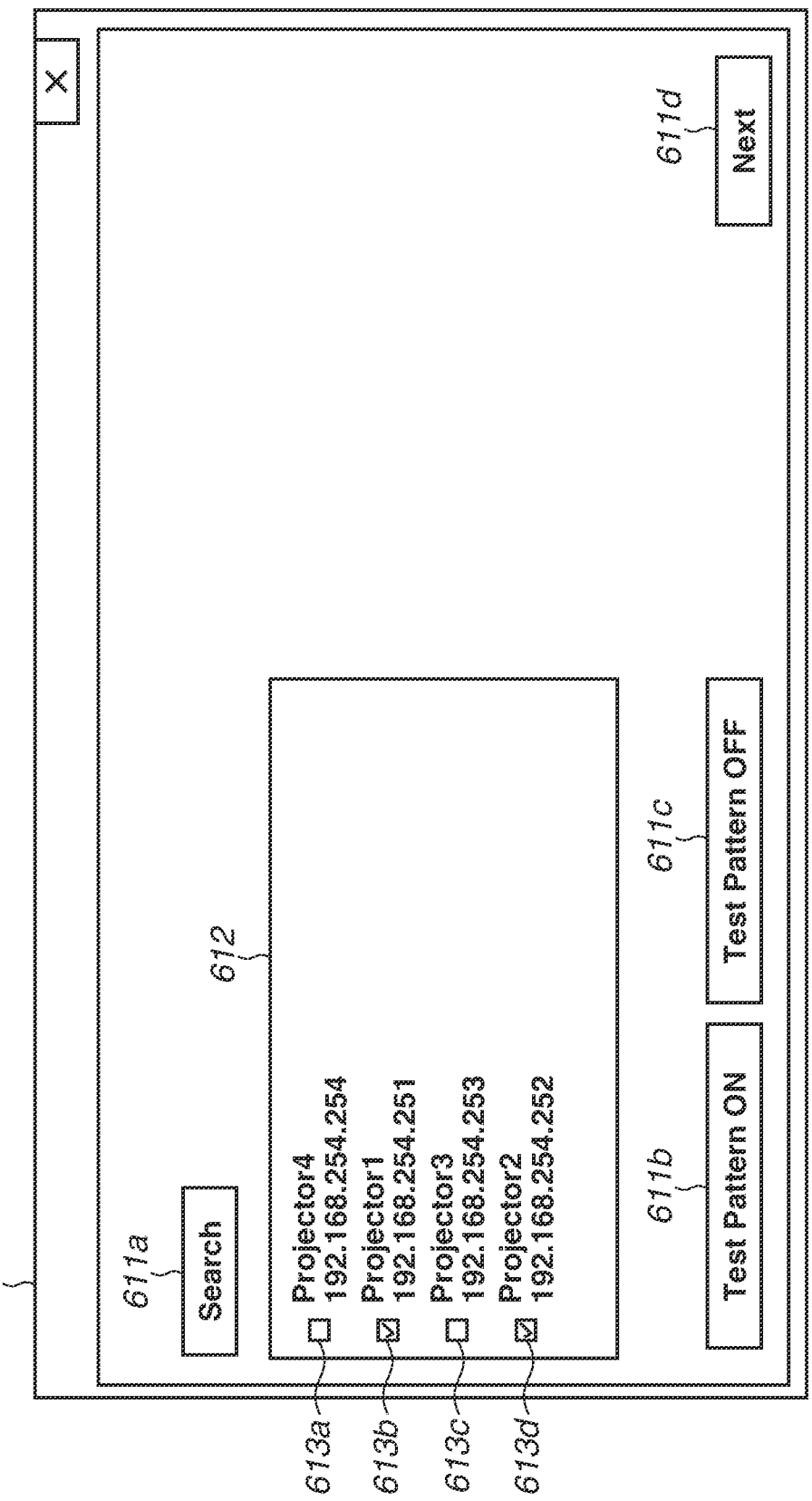
FIG. 4 is a first schematic diagram illustrating a graphical user interface (GUI) which is displayed on a display unit.

FIG. 4 is a schematic diagram illustrating an example of an operation screen (graphical user interface (GUI)) 610, which the CPU 201 displays on the display unit 205 during execution of processing in steps S301 to S303. The user is allowed to control execution of the above-mentioned processing by operating the GUI 610 displayed on the display unit 205 via the operation unit 204. The GUI 610 includes buttons 611a to 611d, a list 612, and checkboxes 613a to 613d.

First, the CPU 201 performs processing for detecting connection projectors connected to the projection control apparatus 200 via a network. The button 611a is a GUI for issuing an instruction to start performing processing for detecting connection projectors connected to the projection control apparatus 200 via a network. When the CPU 201 detects that the button 611a has been pressed via the operation unit 204, the CPU 201 requests identification information for identifying each projector from each projector via the network IF 206. Specifically, the CPU 201 broadcasts, onto the network, a command for requesting identification information with use of a protocol such as the User Datagram Protocol (UDP). Furthermore, the acquisition of identification information can be performed with use of a protocol other than the UDP. The identification information is assumed to be, for example, information indicating at least one of a projector name and an Internet Protocol (IP) address. Furthermore, the identification information can include information indicating the amount of keystone deformation.

When receiving the command via the network IF 108, the CPU 101 of the projector 100 connected to the network transmits, to the projection control apparatus 200, data including identification information for identifying the projector itself. The CPU 201 of the projection control apparatus 200 receives identification information transmitted from the projector 100 which has responded to the command.

Next, the CPU 201 performs processing for displaying the connection projectors. The CPU 201 displays, on the display unit 205, information indicating the projectors 100 which are connected to the projection control apparatus 200 via the network. The list 612 is a list view indicating, in a list form, at least one of pieces of information indicating the projector name and the IP address of each of the projectors 100 which are connected to the projection control apparatus 200 via the network. Furthermore, the alignment sequence of projectors which are displayed in the list 612 can be the sequence of detection of projectors or can be the sequence obtained as a result of sorting performed based on a specific rule.

Next, the CPU 201 performs processing for determining target projectors from among the projectors displayed in the list 612.

The list 612 includes checkboxes 613 for performing selection of the respective projectors. As illustrated in FIG. 4, when four projectors 100a to 100d are assumed to be connected to the projection control apparatus 200 via the network, in the list 612, checkboxes 613a to 613d are displayed next to pieces of identification information of the respective projectors. The user selects projectors targeted for adjustment of a projection area (target projectors) by checking some or all of the checkboxes 613a to 613d. The target projectors can be said to be projectors the projection areas of which are caused to be superposed on each other in performing stack projection.

For example, suppose that the projector 100a (Projector1, 192.168.254.251) and the projector 100b (Projector2, 192.168.254.252) are selected as the target projectors. In this case, the user only needs to check the checkbox 613b and the checkbox 613d of the GUI 610. Information about the projectors for which the checkboxes have been checked (for example, the project names and the IP addresses) is then stored in the RAM 202 of the projection control apparatus 200. Furthermore, when the projection of a test pattern described below is performed, projectors the projection areas of which are more easily adjustable can be selected as the target projectors. In the present exemplary embodiment, the projectors 100a to 100d are assumed to be selected as the target projectors. The processing then proceeds to step S302.

In step S302, the CPU 201 performs control to cause each target projector to project a test pattern. The button 611b is a GUI for issuing an instruction to each target projector to start projecting a test pattern. The button 611c is a GUI for issuing an instruction to each target projector to stop projecting the test pattern.

When the CPU 201 detects that the button 611b has been pressed via the operation unit 204, the CPU 201 transmits, to each target projector via the network IF 206, a command for issuing an instruction to display a test pattern. The test pattern is a test pattern used to facilitate confirmation of the size or position of the display area of each projector 100. For example, the test pattern is assumed to be a lattice-like image. Furthermore, the test pattern can be transmitted while being associated with a command for issuing an instruction from the projection control apparatus 200 to each target projector to display a predetermined test pattern, or a plurality of commands for causing each target projector to draw, for example, optional straight lines, graphics, or character strings can be transmitted in combination.

When the CPU 201 detects that the button 611c has been pressed via the operation unit 204, the CPU 201 transmits, to each target projector via the network IF 206, a command for stopping projection of the test pattern.

The button 611d is a GUI for inputting an instruction to advance the processing from step S302 to step S303. When the CPU 201 detects that the button 611d has been pressed via the operation unit 204, the processing proceeds to step S303. At this time, it is desirable that the processing proceed in a state in which the target projector is projecting the test pattern.

Figure 5:
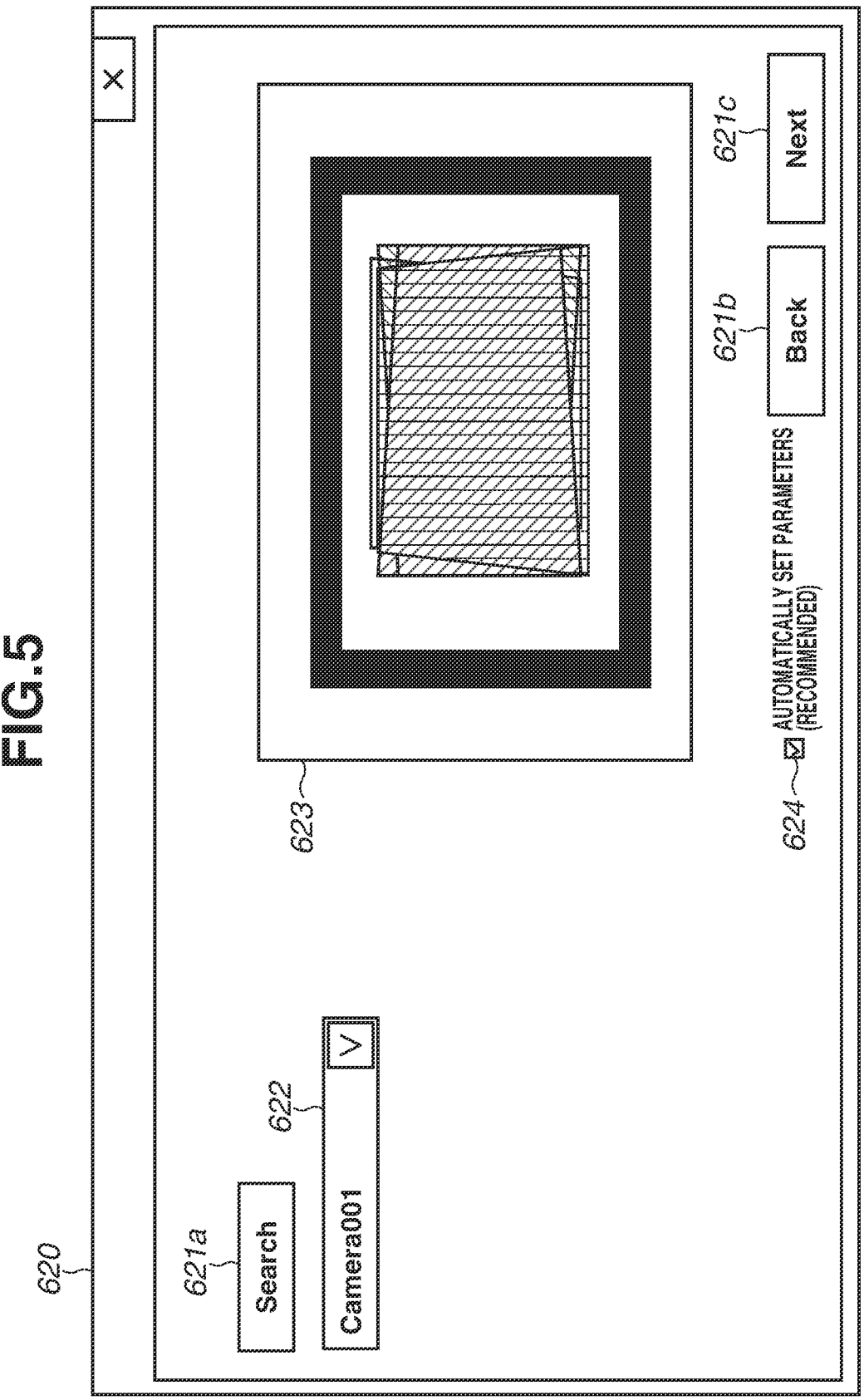
FIG. 5 is a second schematic diagram illustrating a GUI which is displayed on the display unit.

In step S303, the CPU 201 performs processing for selecting an imaging apparatus 400 which is used for position adjustment processing. In step S303, the CPU 201 performs selection of an imaging apparatus 400 which is used for position adjustment processing in response to an input from the user. FIG. 5 is a schematic diagram illustrating a GUI 620 which the CPU 201 displays on the display unit 205 during execution of processing in step S303. The GUI 620 includes buttons 621a to 621c, a drop-down list 622, a display region 623, and a checkbox 624.

When the CPU 201 detects that the button 621a has been pressed via the operation unit 204, the CPU 201 of the projection control apparatus 200 acquires information (for example, the product name of a camera) indicating an imaging apparatus connected via the communication unit 208 or the network IF 206. Then, the CPU 201 displays the acquired information in the drop-down list 622. The user selects any one of a plurality of cameras displayed in the drop-down list 622 as an imaging apparatus 400 which is used for position adjustment processing. Furthermore, a plurality of imaging apparatuses 400 can be selected.

The display region 623 is a region used to display an image captured by the camera (imaging apparatus 400) selected in the drop-down list 622. The CPU 201 of the projection control apparatus 200 transmits, to the selected imaging apparatus 400, a command for issuing an instruction to perform image capturing, and then displays an image in the display region 623 based on the acquired captured image. An image which is displayed in the display region 623 is assumed to be a live view image captured by the selected imaging apparatus 400. Furthermore, an image which is displayed in the display region 623 can also be a still image that is based on a captured image captured by the imaging apparatus 400 at predetermined timing. The user is able to confirm whether all of the projection images (test patterns) projected by the target projectors fall within the captured image displayed in the display region 623. The user performs optical adjustment of, for example, the position or angle of the imaging apparatus 400 or the zoom thereof in such a manner that the projection images projected by the target projectors fall within the captured image.

The checkbox 624 is a GUI for setting whether to perform automatic setting processing for image capturing parameters, in which the projection control apparatus 200 automatically calculates image capturing parameters (for example, an aperture value and a shutter speed) of the imaging apparatus 400. When the checkbox 624 is checked, to perform automatic setting processing for image capturing parameters is set.

The button 621b is a GUI for inputting an instruction to return the processing from step S303 to step S301. When the CPU 201 detects that the button 621b has been pressed via the operation unit 204, the processing returns to step S301, so that the GUI 610 illustrated in FIG. 4 is displayed on the display unit 205.

The button 621c is a GUI for inputting an instruction to complete step S303. When the CPU 201 detects that the button 621c has been pressed via the operation unit 204, the processing proceeds to step S304.

In step S304, the CPU 201 determines the presence or absence of an instruction to perform automatic setting processing. The CPU 201 determines the presence or absence of an instruction to perform automatic setting processing, according to an instruction input to the checkbox 624. If it is determined that there is no instruction to perform automatic setting processing (NO in step S304), the processing proceeds to step S305. If there is an instruction to perform automatic setting processing (YES in step S304), the processing proceeds to step S310.

Figure 6:
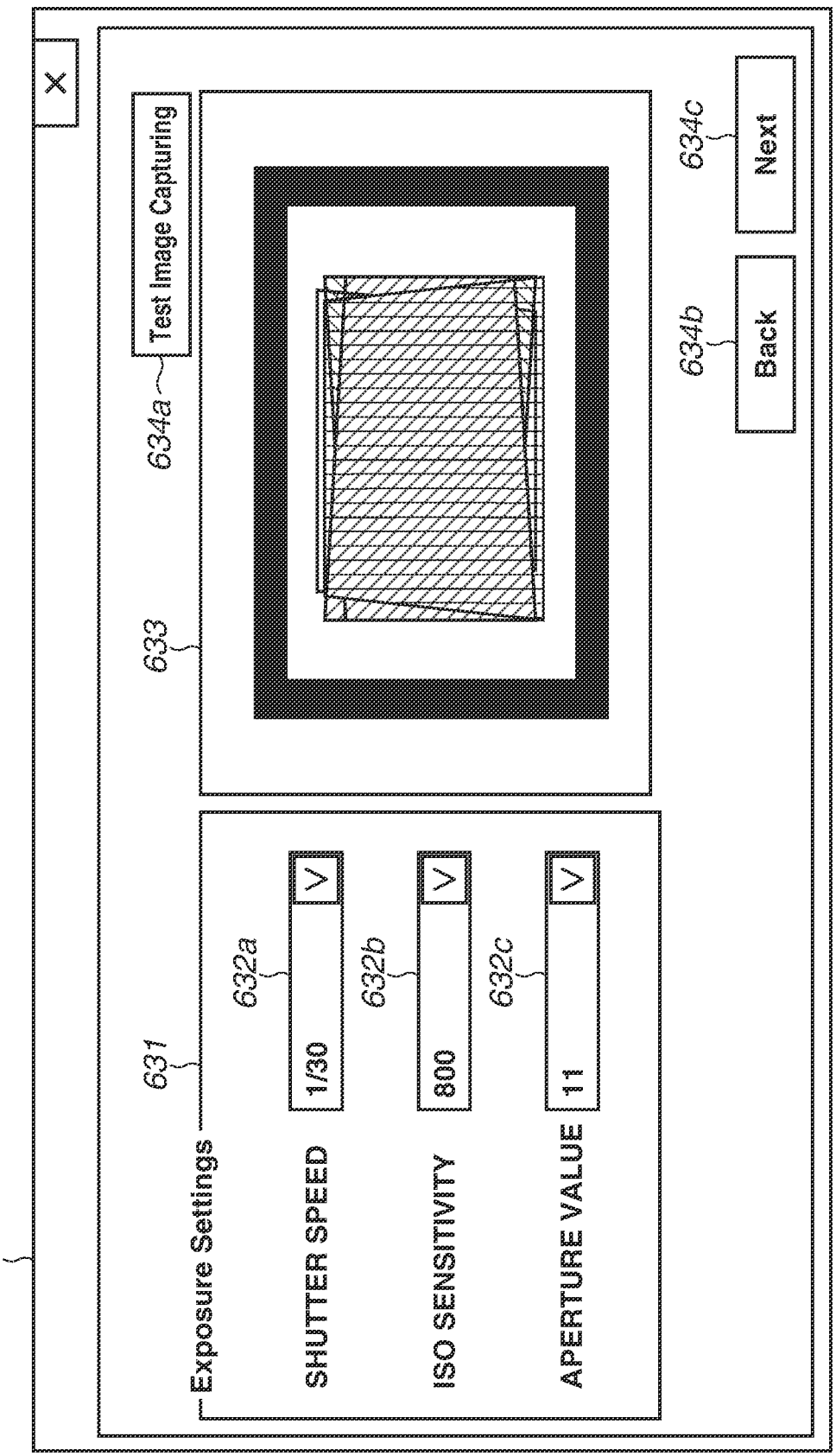
FIG. 6 is a third schematic diagram illustrating a GUI which is displayed on the display unit.

In step S305, the CPU 201 performs setting processing for image capturing parameters of the imaging apparatus 400. The image capturing parameters include, for example, a shutter speed, an ISO sensitivity, and an aperture value. FIG. 6 is a schematic diagram illustrating a GUI 630 which the CPU 201 displays on the display unit 205 during execution of processing in step S305. The GUI 630 includes an image capturing parameter setting region 631, drop-down lists 632a to 632c, a display region 633, and buttons 634a to 634c.

The image capturing parameter setting region 631 is a region in which to display a GUI for setting image capturing parameters. The image capturing parameter setting region 631 includes the drop-down lists 632a to 632c, which are respectively used to set a shutter speed, an ISO sensitivity, and an aperture value of the imaging apparatus 400. The user sets the image capturing parameters of the imaging apparatus 400 by selecting setting values of the respective image capturing parameters from the drop-down lists 632a to 632c. Furthermore, the settable parameters of a camera are not limited to these, but, for example, a configuration in which a white balance method or a light metering method is settable can also be employed.

The button 634a is a GUI for inputting an instruction to output an image capturing instruction to the imaging apparatus 400. When the CPU 201 detects that the button 634a has been pressed via the operation unit 204, the image capturing instruction is output to the imaging apparatus 400.

In response to the image capturing instruction, the imaging apparatus 400 captures an image of the projection surface 500, and outputs the acquired image data (captured image) to the projection control apparatus 200.

The display region 633 is a display region in which to display an image based on the captured image acquired from the imaging apparatus 400. Since the captured image which is acquired at this time and the image which is displayed at that time are images used to check whether the image capturing parameters, such as a shutter speed, have been able to be correctly set, it is desirable that each image be a still image, but each image can be a live view image.

The button 634b is a GUI for inputting an instruction to return the processing from step S305 to step S303. When the CPU 201 detects that the button 634b has been pressed via the operation unit 204, the processing returns to step S301, so that the GUI 610 illustrated in FIG. 4 is displayed on the display unit 205.

The button 634c is a GUI for inputting an instruction to complete step S305. When the CPU 201 detects that the button 634C has been pressed via the operation unit 204, the processing proceeds to step S306.

Step S310 is automatic setting processing which automatically performs, under the control of the CPU 201, setting processing for image capturing parameters, which would be performed by the GUI operation of the user in step S305. In step S310, the CPU 201 transmits instructions to control the respective target projectors one by one to project the respective test patterns. Moreover, in a state in which one of the target projectors is projecting a test pattern, the CPU 201 causes the imaging apparatus 400 to capture an image. The CPU 201 analyzes the obtained captured image and determines, for example, whether a sufficient quantity of light has been obtained or where a focus position has been correctly adjusted. The CPU 201 controls the image capturing parameters according to a result of determination, and repeats the above-mentioned image capturing and determination, thus setting optimum image capturing parameters. The processing in step S310 proceeds to step S306 in response to the completion of the above-mentioned setting of image capturing parameters with respect to all of the target projectors.

Figure 7:
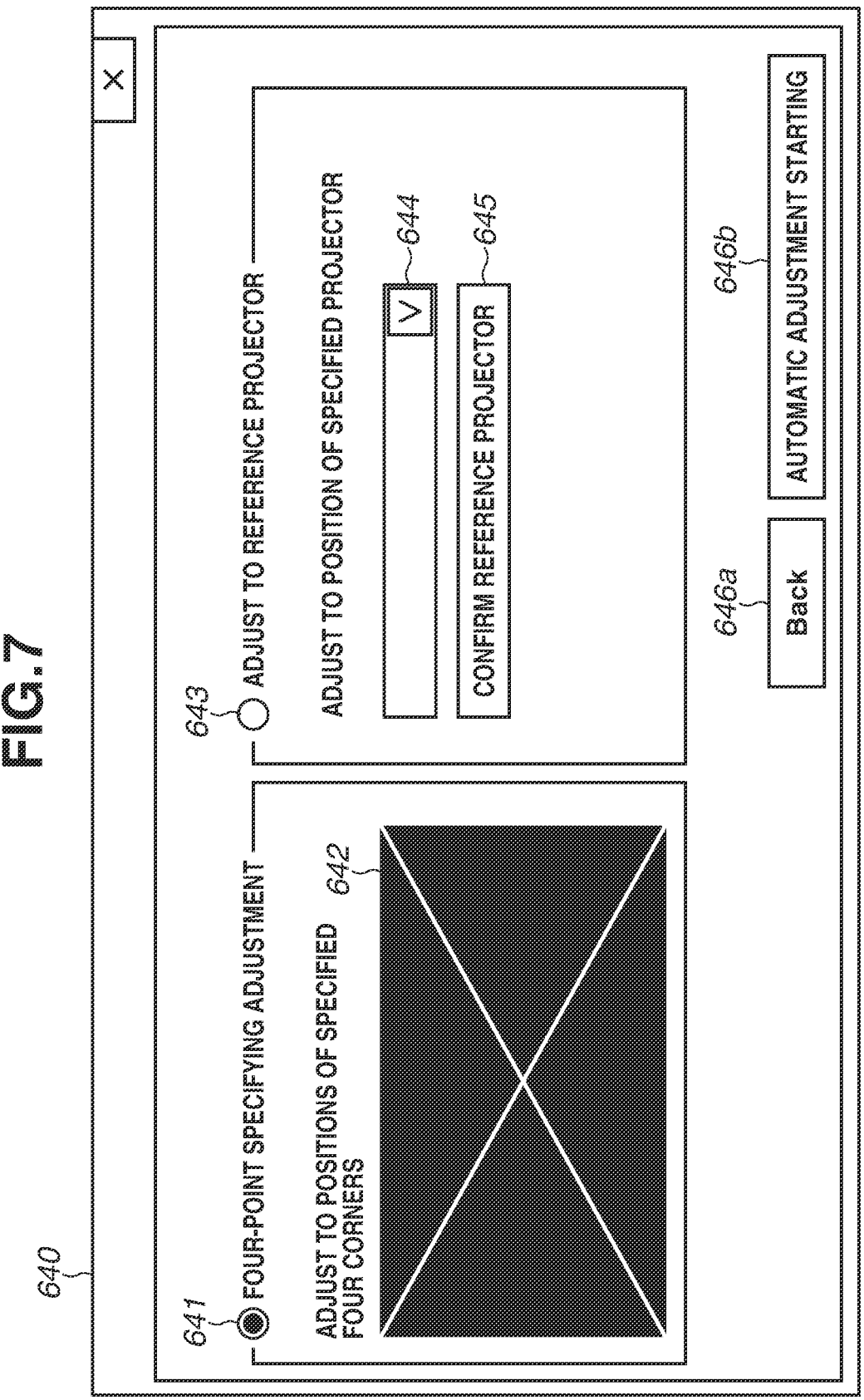
FIG. 7 is a fourth schematic diagram illustrating a GUI which is displayed on the display unit.

Step S306 is processing for selecting a method of position adjustment processing (adjustment mode). FIG. 7 is a schematic diagram illustrating a GUI 640 which the CPU 201 displays on the display unit 205 during execution of the processing in step S306. The GUI 640 includes a radio button 641, a four-point specifying GUI 642, a radio button 643, a drop-down list 644, a button 645, and buttons 646a and 646b.

In step S306, the user selects any one of a four-point specifying adjustment mode, which matches the four corners of a projection area with the specified four points, and a reference projector matching mode, which matches the projection area of a target projector with the projection area of a reference projector which is previously set. The user selects the adjustment mode by selecting any one of the radio button 641 and the radio button 643 of the GUI 640. The CPU 201 of the projection control apparatus 200 stores information about the adjustment mode selected by the user in the RAM 202 thereof.

When the user checks the radio button 641, the four-point specifying adjustment mode is selected. The four-point specifying adjustment mode is a mode which automatically determines control parameters of, for example, keystone correction with respect to the projection area of each target projector in such a way as to cause the vertices of each projection area to match predetermined four points. The four-point specifying adjustment is useful in a case where the projection target position is definite, such as in a case where the projection surface is a framed screen. Furthermore, the number of points which are usable to adjust the coordinates can be less than four, or can be five or more including coordinates other than vertices.

The four-point specifying GUI 642 is a GUI which is used, in the four-point specifying adjustment mode, for the user to specify four points with which to match the vertices of the projection area. For example, the user specifies four points by moving a cursor displayed in the four-point specifying GUI 642.

When the user checks the radio button 643, the reference projector matching mode is selected. The reference projector matching mode is a mode which automatically determines control parameters of, for example, keystone correction with respect to the projection areas of target projectors other than a reference projector which has been set from among the target projectors in such a way as to match the projection areas of the other target projectors with the projection area of the reference projector. In this mode, automatic position adjustment is performed in a case where the position of the projection area of the reference projector has been adjusted to the specified position. The reference projector matching mode automatically determines a keystone correction amount for matching the projection areas of projectors other than the reference projector with the projection area of the reference projector. Unlike the four-point specifying adjustment mode, the reference projector matching mode is useful in a case where the projection target position is not definite (for example, in the case of projection onto a wall surface).

The drop-down list 644 is used to select a reference projector. The projector which is selectable at the drop-down list 644 is one of the target projectors selected in step S301. The user selects one intended projector from the drop-down list 644, and the CPU 201 of the projection control apparatus 200 sets the selected projector as a reference projector and stores the reference projector in the RAM 202 thereof.

The button 645 is a GUI for inputting an instruction to the selected reference projector to project a specific test pattern. When the CPU 201 detects that the button 645 has been pressed via the operation unit 204, the CPU 201 transmits, to each target projector via the network IF 206, a command to display a specific test pattern. At this time, only the reference projector is caused to display a test pattern which differs in any one of color, luminance, and shape from the test pattern displayed by the other target projectors, so that the user can readily confirm which projector on the projection surface is the reference projector.

The button 646a is a GUI for inputting an instruction to return the processing from step S305 to step S304. When the CPU 201 detects that the button 646a has been pressed via the operation unit 204, the processing returns to step S304, so that the GUI 630 illustrated in FIG. 6 is displayed on the display unit 205.

The button 646b is a GUI for completing step S306 and definitely determining the adjustment mode. When the CPU 201 detects that the button 646b has been pressed via the operation unit 204, the processing proceeds to step S307.

Figure 8:
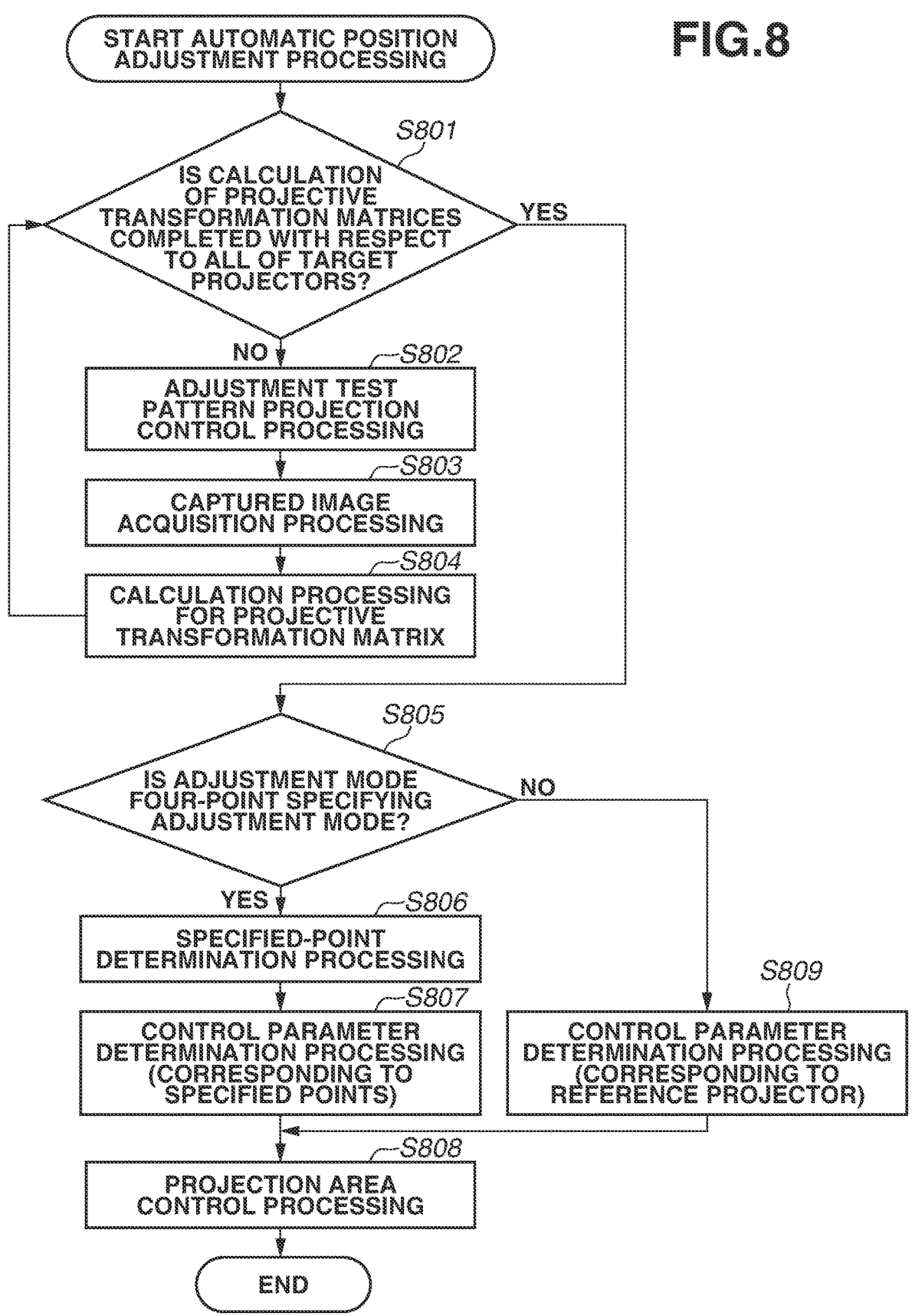
FIG. 8 is a flowchart illustrating automatic position adjustment processing.

In step S307, the CPU 201 performs position adjustment processing of projection areas of the target projectors according to the selected adjustment mode. FIG. 8 is a flowchart illustrating automatic position adjustment processing.

In the position adjustment processing, processing in steps S801 to S804 is performed to calculate projective transformation matrices of the coordinate system of a liquid crystal panel of each target projector and the imaging apparatus (camera) 400 and store the calculated projective transformation matrices in the RAM 202 of the projection control apparatus 200.

In step S801, the CPU 201 determines whether projective transformation matrices described below have been calculated with respect to all of the target projectors. If it is determined that the projective transformation matrices have not been calculated with respect to all of the target projectors (NO in step S801), the processing proceeds to step S802.

In step S802, the CPU 201 outputs, to any one of the target projectors (for example, the projector 100a) via the network IF 206, an instruction to display a test pattern. In step S803, the CPU 201 outputs an image capturing instruction to the imaging apparatus 400 via the communication unit 208, and then acquires a captured image from the imaging apparatus 400.

In step S804, the CPU 201 detects the coordinates of points at four corners (feature points) of the test pattern projected by the projector 100a from the captured image acquired in step S803, and calculates a projective transformation matrix indicating a correspondence relationship between the projector 100a and the imaging apparatus 400 from the calculated coordinates. Furthermore, the usable method of detecting feature points of a captured image includes a known technique of, for example, detecting feature points in an image.

Figure 9A:
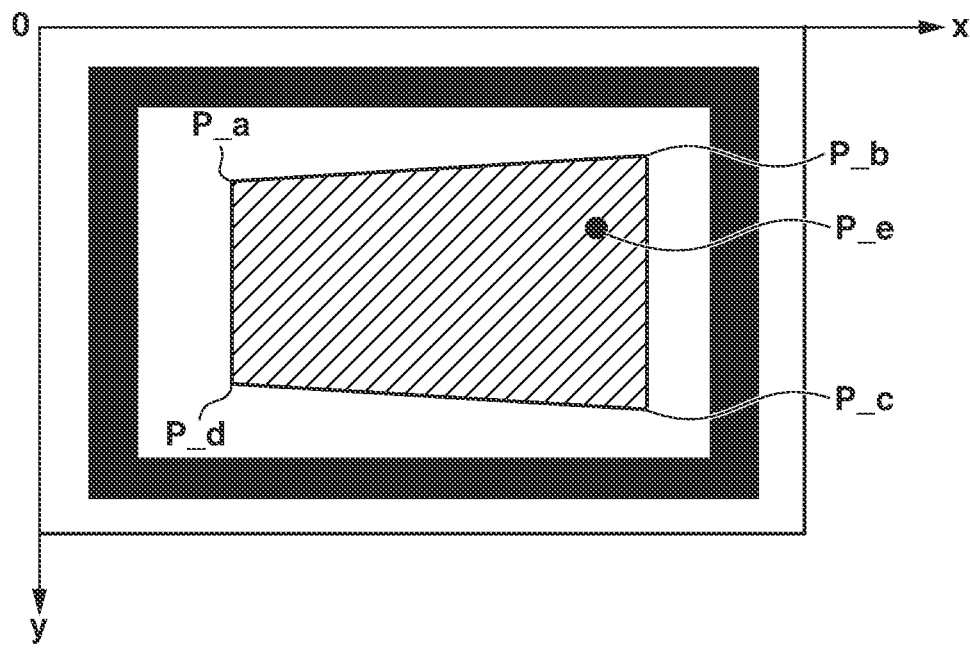
FIGS. 9A and 9B are schematic diagrams illustrating coordinates of a captured image and panel coordinates of a projector.
Figure 9B:
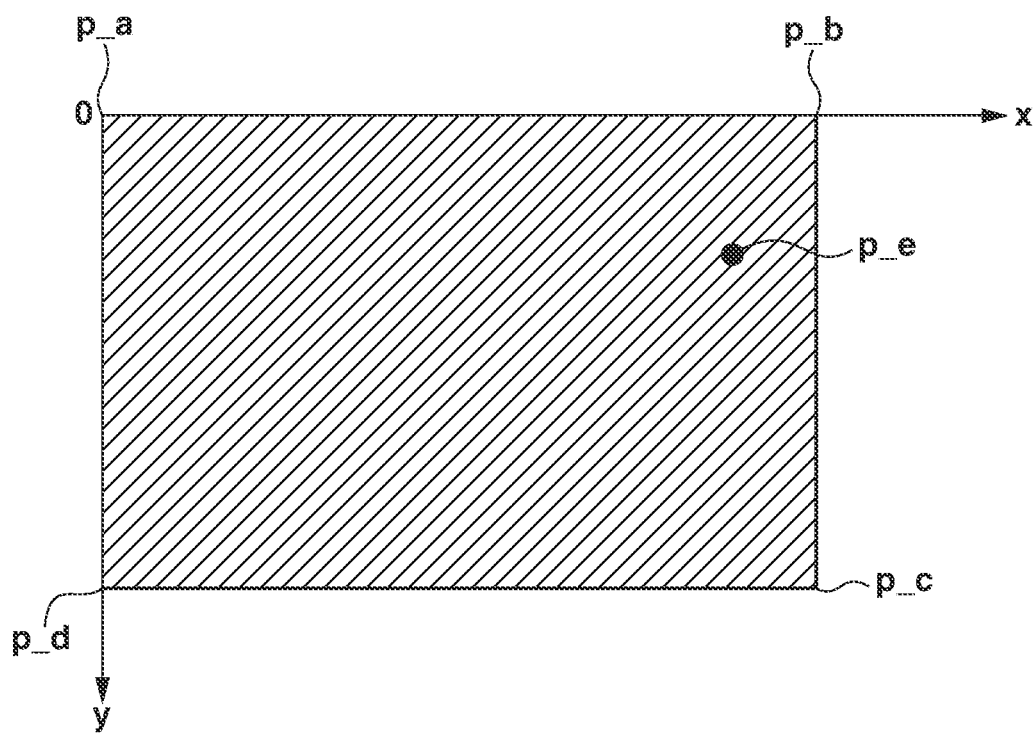

FIGS. 9A and 9B are schematic diagrams illustrating the coordinates of a captured image and the panel coordinates of a projector. Processing for calculating the projective transformation matrix in step S804 is described with reference to FIGS. 9A and 9B. FIG. 9A is a schematic diagram illustrating a coordinate system of the captured image acquired from the imaging apparatus 400 (camera coordinate plane). FIG. 9B is a schematic diagram illustrating a panel coordinate system of the target projector which has displayed a test pattern in step S802 (projector coordinate plane). When coordinates on the projector coordinate plane are denoted by (xi, yi) and coordinates on the camera coordinate plane are denoted by (Xi, Yi), the projective transformation formulae are expressed by the following formulae (3) and (4) (i being a natural number). At this time, variables with the same i represent mutually corresponding variables.

$$x_i = \frac{aX_i + bY_i + c}{gX_i + hY_i + 1} \quad (3)$$

$$y_i = \frac{dX_i + eY_i + f}{gX_i + hY_i + 1} \quad (4)$$

Here, "a" to "h" denote predetermined constants.

The following formula (5) is a formula obtained by deforming the above formulae (3) and (4) and expressing them with a matrix.

$$\lambda \begin{pmatrix} x \\ y \\ 1 \end{pmatrix} = M \begin{pmatrix} X \\ Y \\ 1 \end{pmatrix}, M = \begin{pmatrix} a & b & c \\ d & e & f \\ g & h & 1 \end{pmatrix} \quad (5)$$

M obtained at this time is a projective transformation matrix. The projective transformation matrix is able to be calculated by assigning corresponding four sets of points (x1, y1, X1, Y1), (x2, y2, X2, Y2), (x3, y3, X3, Y3), and (x4, y4, X4, Y4) to formulae (3) and (4). Thus, as long as the correspondence relationship between the coordinates of at least four points on the respective planes are found, it is possible to calculate a projective transformation matrix.

For example, in step S802, the selected target projector projects a quadrangular test pattern (a hatched portion illustrated in FIG. 9B). At this time, it becomes possible to calculate a projective transformation matrix based on a correspondence relationship between coordinates of four points at the vertices of a projection image (quadrangle) in the captured image and coordinates of four points at the vertices of a quadrangle of the test pattern in the panel of the target projector. Points P_a, P_b, P_c, and P_d on the camera coordinate plane illustrated in FIG. 9A correspond respectively to points p_a, p_b, p_c, and p_d on the projector coordinate plane illustrated in FIG. 9B. The CPU 201 calculates a projective transformation matrix based on the correspondence relationship between these sets of known four points.

Using the calculated projective transformation matrix enables performing projective transformation of an unknown coordinate point. For example, multiplying a point P_e on the camera coordinate plane by the calculated projective transformation matrix enables calculating a corresponding point p_e on the projector coordinate plane. Moreover, multiplying a point p_e on the projector coordinate plane by an inverse matrix of the calculated projective transformation matrix enables calculating a corresponding point P_e on the camera coordinate plane.

While the above-mentioned method is able to be used to calculate a projective transformation matrix, the image which the projector projects to be used for calculation does not need to be a quadrangle. As long as the image is able to be used to obtain a correspondence relationship in coordinates of at least four points between the camera coordinate plane and the projector coordinate plane, the image can be any type of image.

If, in step S801, it is determined that the projective transformation matrices have been calculated with respect to all of the target projectors (YES in step S801), the processing proceeds to step S805.

In step S805, the CPU 201 determines whether the adjustment mode designated by the user is the four-point specifying adjustment mode. If, in step S805, it is determined that the adjustment mode is the four-point specifying adjustment mode (YES in step S805), the processing proceeds to step S806.

In step S806, the CPU 201 determines four points (specified points) for specifying a deformed shape of the projection area. The specified points can be previously set in step S305. Here, the CPU 201 sets the specified points again. The CPU 201 issues an instruction to any one of the target projectors to project markers for setting the specified points onto the projection surface 500. The user operates the target projector which is projecting the markers and adjusts the positions of the markers, thus determining the specified points. Then, the processing proceeds to step S807.

In step S807, the CPU 201 determines control parameters for the projection areas of the respective target projectors in such a manner that the projection areas of the respective target projectors are superposed on each other on the projection surface. For example, the control parameter is assumed to be a keystone deformation amount. The CPU 201 calculates coordinates (corresponding specified points) on the projector coordinate plane of each target projector corresponding to coordinates of the markers (specified points) in a captured image, with use of the projective transformation matrix of each target projector stored in the RAM 202. Specifically, the CPU 201 determines the keystone deformation amount of each target projector in such a manner that the four corners of the projection area of each target projector are located at the corresponding specified points. Then, the processing proceeds to step S808.

If, in step S805, it is determined that the adjustment mode is not the four-point specifying adjustment mode (NO in step S805), this means that the adjustment mode is the reference projector adjustment mode. In this case, the processing proceeds to step S809.

In step S809, the CPU 201 determines control parameters of the projection areas of target projectors other than the reference projector set in step S305, based on the position of the projection area of the reference projector. Specifically, the CPU 201 determines the keystone deformation amount of each target projector based on the positions of four corners on the camera coordinate plane of the reference projector, the images of which have been captured in step S803, and the positions and the projective transformation matrices of target projectors other than the reference projector. Then, the processing proceeds to step S808.

In step S808, the CPU 201 transmits the keystone deformation amount calculated in step S807 to each target projector via the network IF 206. The image processing unit 109 of each target projector performs shape correction of the input image based on the acquired keystone deformation amount. In other words, step S808 is processing for controlling the position or shape of the projection area of each target projector based on the determined control parameter.

With the above-described processing, position adjustment processing for causing the projection areas of the selected target projectors to be superposed on each other is autonomously performed by the CPU 201 of the projection control apparatus 200.

<Characteristic Operations in Present Exemplary Embodiment>

In the above-described way, it is possible to cause the projection areas of the selected target projectors to match each other with a high degree of accuracy. However, in a case where, for example, the projection surface 500 is a fabric screen, the projection areas of some target projectors may deviate from the projection areas of the other target projectors due to, for example, the projection surface 500 moving during position adjustment processing. Moreover, the projection areas of some target projectors may shift due to causes such as a heat generated by the projector 100 being driven or an externally applied vibration. In such a case, performing position adjustment processing again is time-consuming even though the CPU 201 is able to automatically perform the processing. Moreover, in a case where, for example, the projection surface 500 is moving minutely, even if the processing is repeatedly performed, it is, in some cases, difficult to cause the projection areas to match each other with a high degree of accuracy.

In such a case, it is effective to manually fine-adjust the projection areas of the respective target projectors on which position adjustment processing has been performed once. However, if any one of two or more projection areas with respect to which a desired superposed state has been obtained by position adjustment processing is moved, adjustment may be performed again so as to restore the original superposed state, so that a large load may be placed on the user.

The projection control apparatus 200 according to the present exemplary embodiment sets control groups in such a manner that, among two or more target projectors, target projectors the projection areas of which satisfy a predetermined relationship are included in the same control group. Then, the projection control apparatus 200 controls the position or shape of the projection area for every control group.

Figure 10:
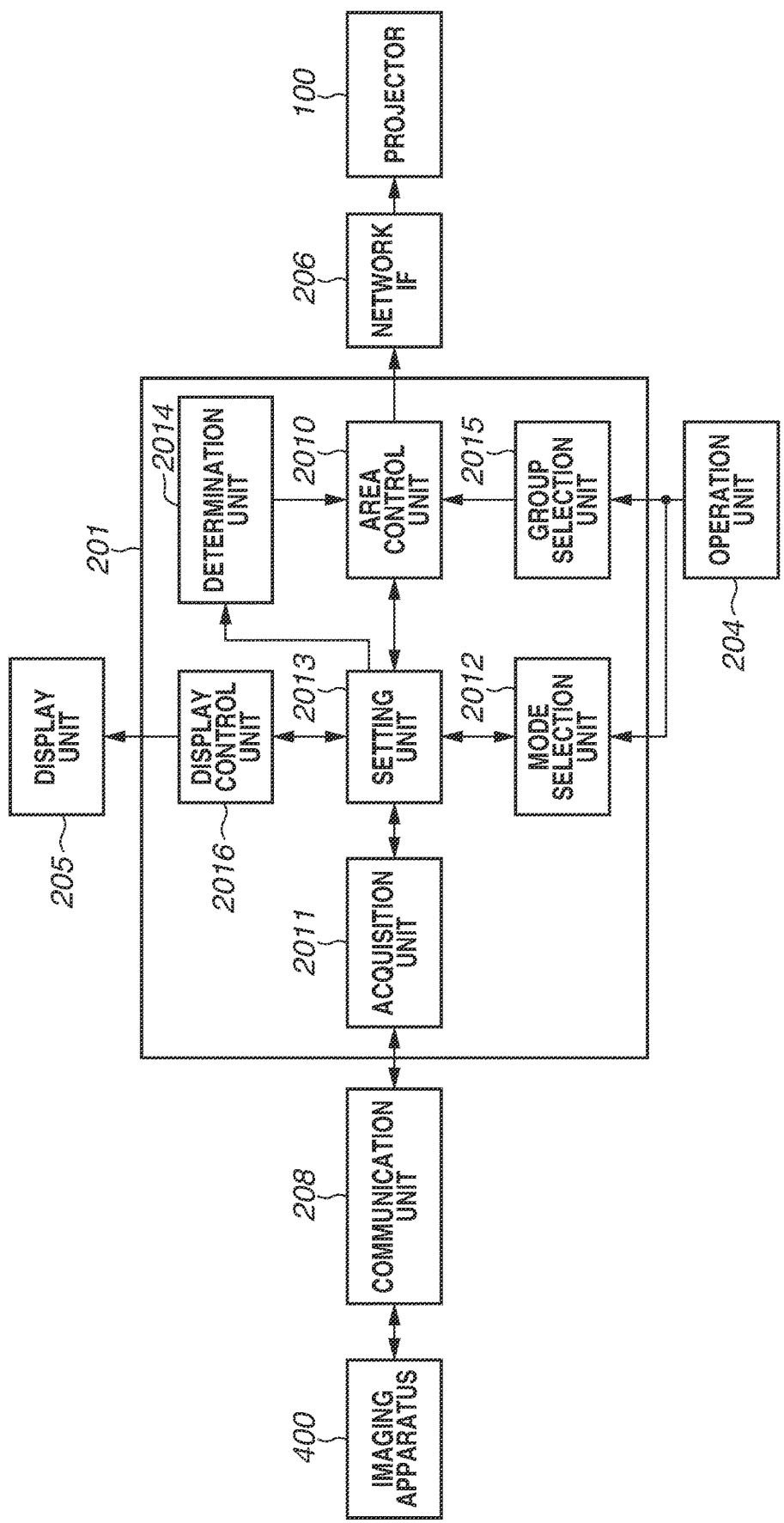
FIG. 10 is a schematic diagram illustrating functional blocks of a central processing unit (CPU), which performs control group setting processing.

FIG. 10 is a block diagram illustrating functional blocks of the CPU 201 for performing control group setting processing. The CPU 201 includes an area control unit 2010, an acquisition unit 2011, a mode selection unit 2012, a setting unit 2013, a determination unit 2014, a group selection unit 2015, and a display control unit 2016.

The area control unit 2010 outputs, to the network IF 206, for example, an instruction to the projector 100 and image data, thus controlling an operation of each projector 100. Moreover, the area control unit 2010 transmits a control parameter for concurrently controlling the positions or shapes of projection areas of projectors 100 belonging to a control group set by the setting unit 2013. The control parameter includes at least one of a position parameter for specifying a position on the projection surface of the projection area and a shape parameter for specifying a shape on the projection surface of the projection area. The position parameter is assumed to be coordinate information indicating coordinates of the projection area and a movement amount for shifting the entire projection area. The shape parameter is assumed to be a parameter (angle information) used for keystone correction. The acquisition unit 2011, which is connected to the imaging apparatus 400 via the communication unit 208, acquires a captured image, which is obtained by capturing an image of the projection surface 500. The mode selection unit 2012 selects, according to an input from the user, one of an automatic setting mode, which sets a control group by performing control group setting processing described below, and a manual setting mode, which allows the user to set a control group via the operation unit 204.

The setting unit 2013 sets control groups based on captured images in such a manner that target projectors the projection areas of which mutually satisfy a predetermined relationship belong to the same control group. The determination unit 2014 determines a control group which the area control unit 2010 targets for control from among the control groups set by the setting unit 2013. The group selection unit 2015 selects a control group which the area control unit 2010 targets for control, according to an input from the user. The display control unit 2016 controls the display unit 205 to display a control group and an image indicating target projectors belonging to the control group.

Figure 11:
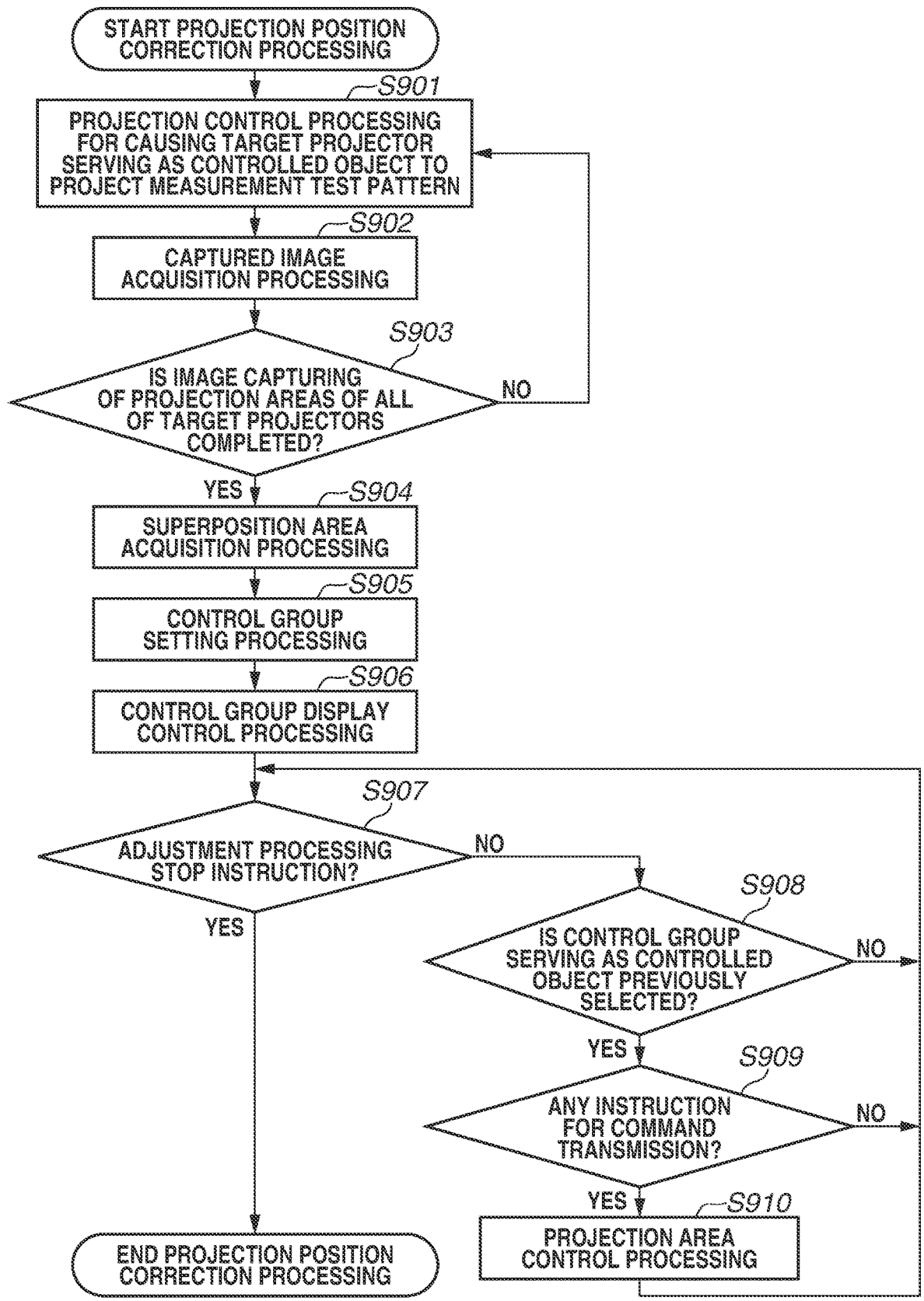
FIG. 11 is a flowchart illustrating projection position correction processing, which is performed after position adjustment processing.

FIG. 11 is a flowchart illustrating projection position correction processing performed after position adjustment processing. The projection position correction processing includes control group setting processing and adjustment processing for the position and shape of a projection area with respect to a control group. The projection position correction processing is assumed to start being performed after the position adjustment processing illustrated in FIG. 3 is completed. As mentioned above, in the present exemplary embodiment, the position adjustment processing is assumed to have been performed with four projectors, i.e., projectors 100a to 100d, set as target projectors.

In step S901, the area control unit 2010 issues an instruction to any one of the target projectors to display a test pattern. The area control unit 2010 selects a target projector serving as a controlled object based on information about target projectors read from the RAM 202. The area control unit 2010 transmits a command to the target projector serving as a controlled object via the network IF 206 in such a way as to cause the target projector serving as a controlled object to display a measurement test pattern. Moreover, the area control unit 2010 transmits commands to the other target projectors via the network IF 206 in such a way as to bring the other target projectors into a non-projecting state. The measurement test pattern only needs to be a pattern based on which a projection area is able to be confirmed, such as an entire white image or a displayed outer frame of the projection image. The non-projecting state can also be a state of displaying the projection image as an entire black image by performing blanking or a state of stopping projection on the projection surface by controlling the light source.

In step S902, the acquisition unit 2011 controls the imaging apparatus 400 to capture an image of the projection surface 500 on which the measurement test pattern has been projected in step S901. The acquisition unit 2011 acquires a captured image from the imaging apparatus 400. The captured image is then stored in the RAM 202. The processing then proceeds to step S903.

In step S903, the setting unit 2013 determines whether projection processing for test patterns and acquisition processing for captured images have been completed with respect to all of the target projectors. If it is determined that the projection processing and the acquisition processing have been completed with respect to all of the target projectors (YES in step S903), the processing proceeds to step S904. If not so (NO in step S903), the processing proceeds to step S901, in which the controlled object for the projection processing and the acquisition processing is switched to a next projector.

Figure 12A:
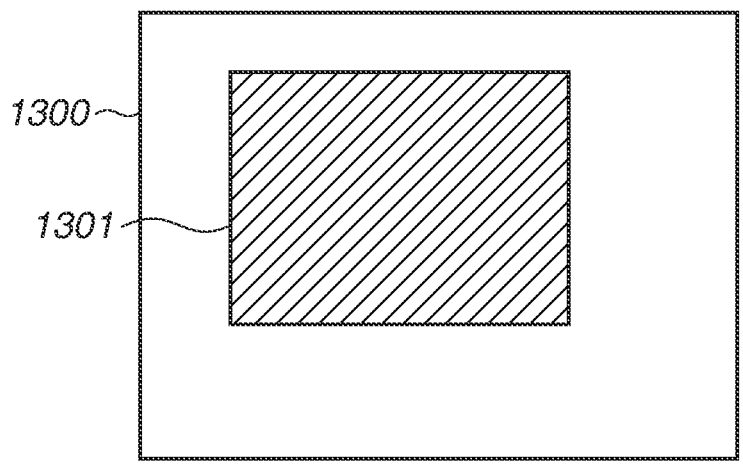
FIGS. 12A, 12B, and 12C are schematic diagrams illustrating superposition in projection area between captured images.
Figure 12B:
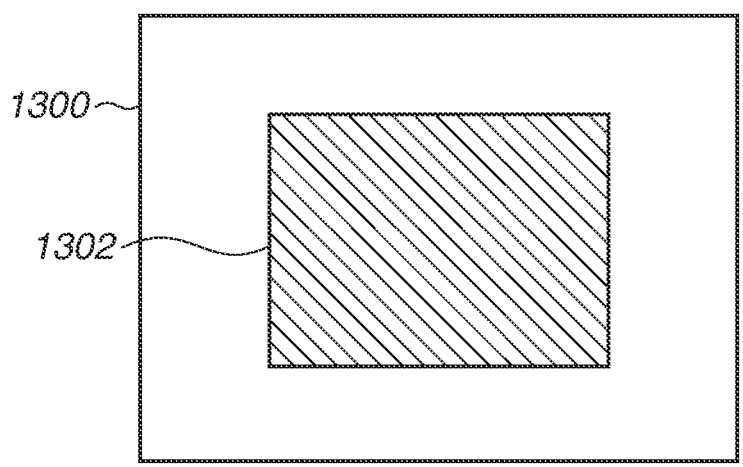
Figure 12C:
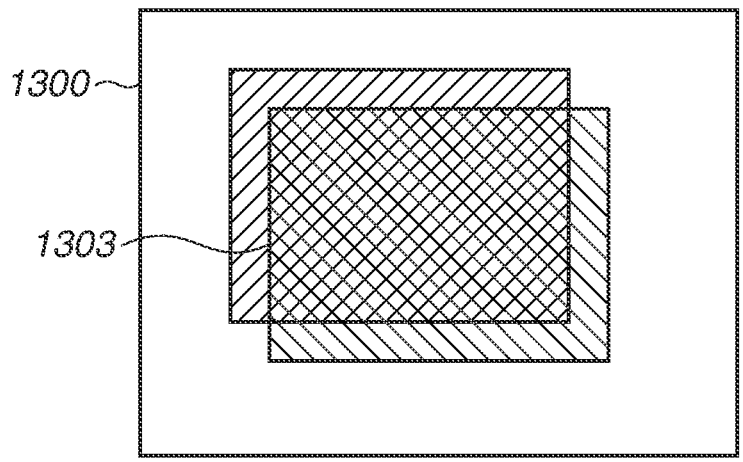

In step S904, the setting unit 2013 acquires the positions of pixels corresponding to the projection area in the captured image corresponding to each target projector. Moreover, the setting unit 2013 acquires an area in which the projection areas are superposed on each other between the captured images (superposition area). FIGS. 12A, 12B, and 12C are schematic diagrams illustrating the projection areas being superposed on each other between the captured images. FIG. 12A illustrates a captured image acquired in a state in which one of the target projectors (projector 100a) is caused to project a test pattern. An area 1300 indicates the entire captured image, and an area 1301 indicates a test pattern (projection area) projected by the projector 100a. FIG. 12B illustrates a captured image acquired in a state in which one of the target projectors (projector 100b) is caused to project a test pattern. An area 1302 indicates a test pattern (projection area) projected by the projector 100b.

FIG. 12C illustrates superposition of the projection areas of two target projectors in the captured image. The setting unit 2013 calculates the number of pixels included in a superposition area 1303. For purposes of illustration, two projection areas illustrated in FIG. 12C greatly deviate from each other, but are nearly in the state of being superposed on each other as long as after the above-mentioned position adjustment processing is completed.

The setting unit 2013 calculates a group index indicating the degree of superposition in every combination of the projectors 100a to 100d. For example, the group index is assumed to be the ratio of the superposition area between projectors to the projection area in the captured image. If the projection area and the superposition area are equivalent to each other, the ratio is 1, if the superposition area is just half the projection area, the ratio is 0.5, and, if there is no superposition area, the ratio is 0. Furthermore, the group index can be a parameter other than the above-mentioned ratio.

In step S905, the setting unit 2013 sets control groups based on the group index. For example, the setting unit 2013 sets control group in such a manner that target projectors the group index (ratio) thereof is greater than or equal to a threshold value belong to the same control group. If the threshold value is assumed to be 1, target projectors the projection areas of which in the captured image are completely superposed on each other are set to be included in the same control group. The threshold value can be set to have a range in consideration of error. For example, supposing that the threshold value is 0.9, it becomes possible that target projectors in which, while misalignment of projection areas in the captured image is allowed, the projection areas are able to be determined to be nearly superposed on each other are set to be included in the same control group.

For example, suppose that the threshold value is 1. Moreover, suppose that, among the target projectors 100a to 100d, the group index of a combination of the projector 100a and the projector 100b is 1, the group index of a combination of the projector 100c and the projector 100d is 1, and the group index in the other combinations is less than 1. In this case, the projector 100a and the projector 100b are set to be included in a control group 1. Moreover, the projector 100c and the projector 100d are set to be included in a control group 2.

In step S906, the display control unit 2016 acquires information indicating the set control groups from the setting unit 2013, and displays the acquired information on the display unit 205 in such a manner that control groups and target projectors belonging to each control group are discriminable. FIG. 13 is a schematic diagram illustrating a GUI 650, which indicates control groups. The GUI 650 includes control group display regions 651 (651a and 651b), checkboxes 652 (652a and 652b), and a display region 653.

Each control group display region 651 is used to display an image indicating a control group and target projectors belonging to the control group to the user. The control group display region 651a indicates a control group 1 (Group1). The control group display region 651b indicates a control group 2 (Group2).

Each checkbox 652 is used to select a control group to be targeted for transmission processing for a control parameter described below (serving as a controlled object). Specifying the checkbox 652a causes the control group 1 to serve as a controlled object. Moreover, specifying the checkbox 652b causes the control group 2 to serve as a controlled object. Furthermore, the determination unit 2014 can determine that, among the control groups set by the setting unit 2013, a control group the number of target projectors belonging to which is small is a priority group, and the display control unit 2016 can perform control in such a way as to previously specify a checkbox corresponding to the priority group. The target projectors belonging to the priority group can be said to be target projectors the projection positions of which are out of alignment with those of the other target projectors in isolation. Accordingly, previously selecting such target projectors as a target for adjustment of the projection area enables saving the user the trouble of selecting such target projectors again.

The display region 653 is used to display an image indicating the positions of projection images projected from the respective target projectors on the projection surface. A region 654a indicates the position and shape of the projection areas of the projector 100a and the projector 100b on the projection surface. A region 654b indicates the position and shape of the projection areas of the projector 100c and the projector 100d on the projection surface.

Figure 14:
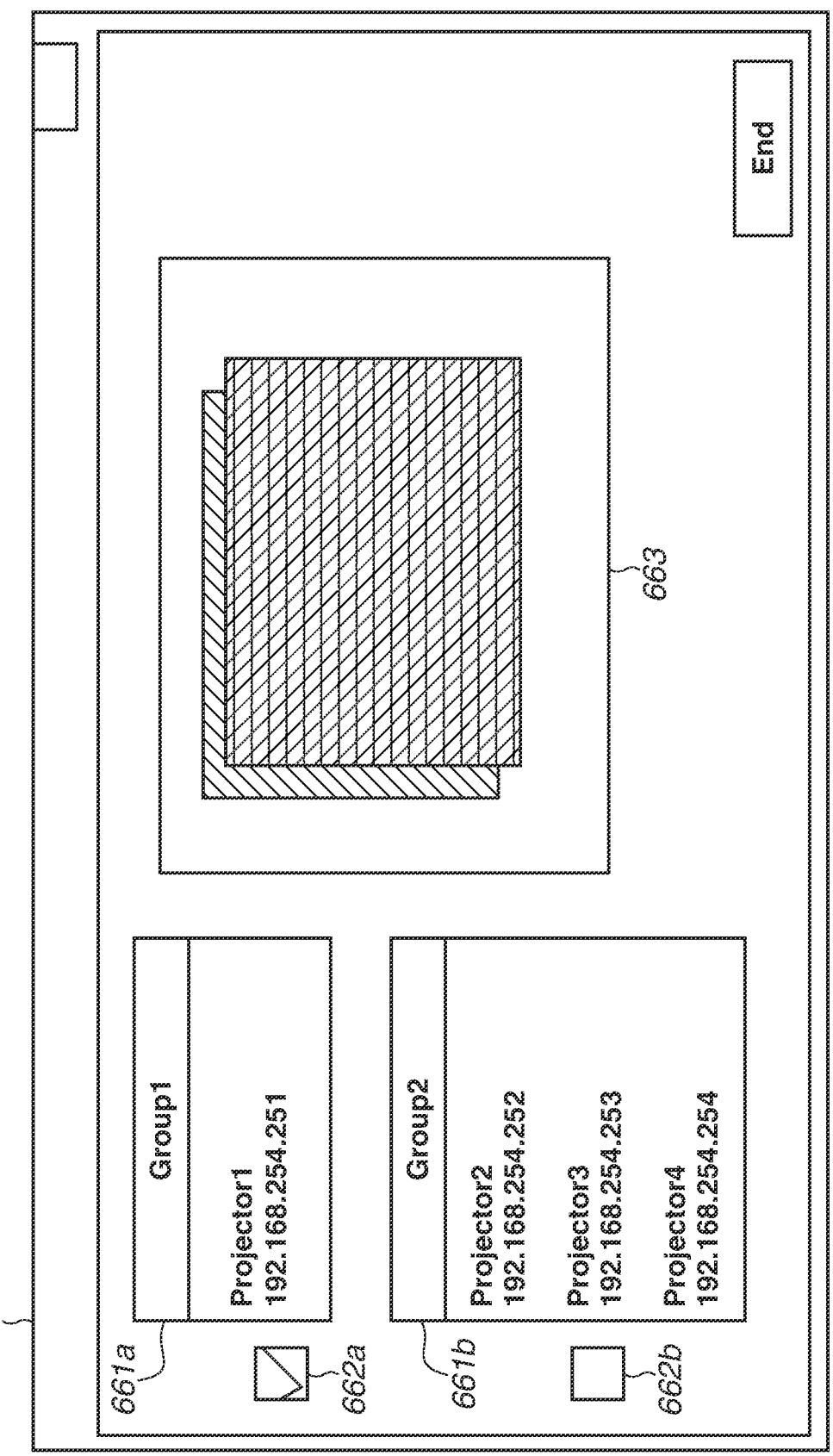
FIG. 14 is a sixth schematic diagram illustrating a GUI which is displayed on the display unit.

FIG. 14 is a schematic diagram illustrating a GUI 660 which the display control unit 2016 displays on the display unit 205 in a case where the setting unit 2013 has set control groups different from those illustrated in FIG. 13. The GUI 660 includes control group display regions 661 (661a and 661b), checkboxes 662 (662a and 662b), and a display region 663. FIG. 14 illustrates a case where the setting unit 2013 has set control groups in such a manner that the projector 100a belongs to a control group 1 and the projectors 100b to 100d belong to a control group 2.

In such a case, the determination unit 2014 determines that the control group 1 (Group1) is a priority group, and the display control unit 2016 previously specifies and displays the checkbox 662a corresponding to the control group 1. This is because, in order to implement superposition of all of the target projectors, which is intended by the user, it is desirable to operate the projector 100a, which belongs to a control group in which the number of projectors targeted for deforming the projection area is small.

Furthermore, a control group serving as a controlled object is able to be selected by the group selection unit 2015 according to an operation performed by the user. Information about the control group serving as a controlled object selected by the determination unit 2014 or the group selection unit 2015 is then input from the area control unit 2010 to the display control unit 2016.

With the above-described processing performed, setting processing for control groups is completed. The processing then proceeds to step S907, so as to perform adjustment processing for the positions and shapes of projection areas with respect to control groups.

In step S907, the area control unit 2010 determines whether the user has issued an instruction to stop the adjustment processing via the operation unit 204. If it is determined that the user has issued an instruction to stop the adjustment processing (YES in step S907), the adjustment processing ends. If not so (NO in step S907), the processing proceeds to step S908.

In step S908, the area control unit 2010 determines whether, among the control groups, the control group serving as a controlled object has been selected. Specifically, the area control unit 2010 is assumed to determine whether a checkbox corresponding to one control group out of the checkboxes of a GUI displayed on the display unit 205 is in a selected state. If it is determined that the control group serving as a controlled object has been selected (YES in step S908), the processing proceeds to step S909. If not so (NO in step S908), the processing returns to step S907.

In step S909, the area control unit 2010 determines whether the user has issued an instruction to transmit a command for adjusting the projection areas with respect to the control group serving as a controlled object. The user inputs and determines an adjustment parameter (control parameter) for the projection area by operating, via the operation unit 204, a GUI for adjustment of the projection area displayed on the display unit 205 separately from the GUI indicating control groups. For example, the control parameter for the projection area is assumed to be a movement amount by which to shift the entire projection area. Furthermore, the control parameter can be a parameter for keystone deformation or an enlargement (reduction) ratio therefor. The user operates the GUI for adjustment and inputs and determines the control parameter, thus issuing an instruction to transmit a command to target projectors belonging to the control group serving as a controlled object.

In step S910, the area control unit 2010 transmits a command indicating the control parameter determined in step S909 to the control group serving as a controlled object. Step S910 is processing in which the area control unit 2010 controls the position or shape of the projection area of a target projector belonging to the control group serving as a controlled object. This enables adjusting the adjustment amounts of the position or shape of the projection areas of target projectors belonging to the control group serving as a controlled object to each other, thus moving or deforming the projection areas in a similar way. Furthermore, a plurality of control groups each serving as a controlled object can also be specified.

Figure 19:
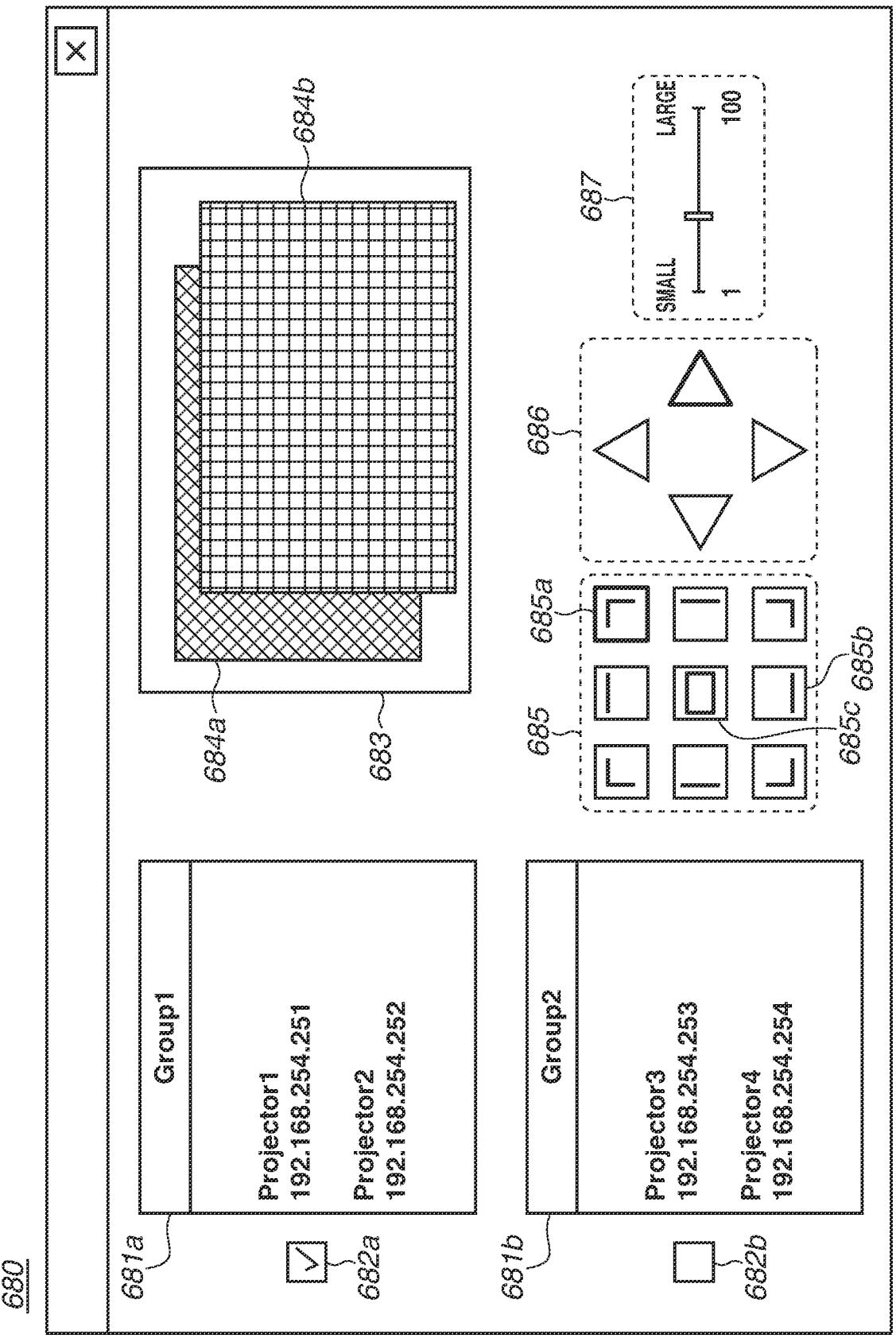
FIG. 19 is an eighth schematic diagram illustrating a GUI which is displayed on the display unit.

A specific example of control of the position or shape of the projection area of a target projector belonging to a control group is described. FIG. 19 is a schematic diagram illustrating a GUI 680, which is displayed on the display unit 205, so as to perform setting of control groups and issue an instruction to move and adjust the projection area with respect to projectors belonging to a control group. The GUI 680 includes control group display regions 681 (681*a* and 681*b*), checkboxes 682 (682*a* and 682*b*), a display region 683, selection buttons 685, and a movement instruction button 686.

The control group display regions 681, the checkboxes 682, and the display region 683 have use applications and functions equivalent to those of the respective elements with the same names of the GUIs 650, 660, and 670. The detailed description thereof is omitted.

In the projection system illustrated in FIG. 1, control groups are previously set as illustrated in FIG. 19. More specifically, the projector 100*a* (Projector1, 192.168.254.251) and the projector 100*b* (Projector2, 192.168.254.252) are included in the control group 1 (Group1). Moreover, the projector 100*c* (Projector3, 192.168.254.253) and the projector 100*d* (Projector4, 192.168.254.254) are included in the control group 2 (Group2). Moreover, the control group 1 is previously selected as the control group serving as a controlled object in step S908.

The selection buttons 685 are a GUI for selecting a portion targeted for movement (movement target portion) out of the projection areas of target projectors belonging to the control group serving as a controlled object. The selection buttons 685 include a plurality of UI images 685*a* respectively indicating four corners of the projection area and a plurality of UI images 685*b* respectively indicating four sides of the projection area. Furthermore, the selection buttons 685 can be composed of only UI images respectively indicating four corners of the projection area. Moreover, the selection buttons 685 further include a UI image 685*c* for setting the entire projection area as a movement target.

The movement instruction button 686 is a UI image for issuing an instruction for the movement direction and movement amount of the movement target portion selected via the selection buttons 685 out of the projection area of a target projector belonging to the control group serving as a controlled object. The movement instruction button 686 includes cursor buttons for issuing respective instructions for up, down, right, and left directions.

In response to the user clicking a cursor button of the movement instruction button 686, an instruction for moving, in a direction corresponding to the cursor button and by a predetermined amount, the movement target portion of the projection area of a target projector belonging to the control group serving as a controlled object is transmitted to the area control unit 2010.

Furthermore, the movement amount corresponding to one click of each cursor button can be a previously determined fixed amount, or can be able to be set by the user. In FIG. 19, the GUI 680 further includes a setting gauge 687 for the movement amount. The user is allowed to set the movement amount corresponding to one click of each cursor button by operating the setting gauge 687.

In the following description, a distance equivalent to one pixel in a captured image is assumed to be designated as the movement amount corresponding to one click of each cursor button.

In response to receiving the above-mentioned instruction, the area control unit 2010 calculates deformation parameters for the respective projection areas with respect to target projectors belonging to the control group serving as a controlled object.

The area control unit 2010 calculates a deformation parameter for each target projector based on a projective transformation matrix between the panel coordinates of each target projector and the coordinates of a captured image, which has previously been acquired.

For example, suppose that, as an instruction for movement issued with respect to the control group 1, an instruction to move the upper right corner of a projection area to the right is input via the user operation. At this time, the movement amount is assumed to be a distance equivalent to one pixel in a captured image.

Figure 20:
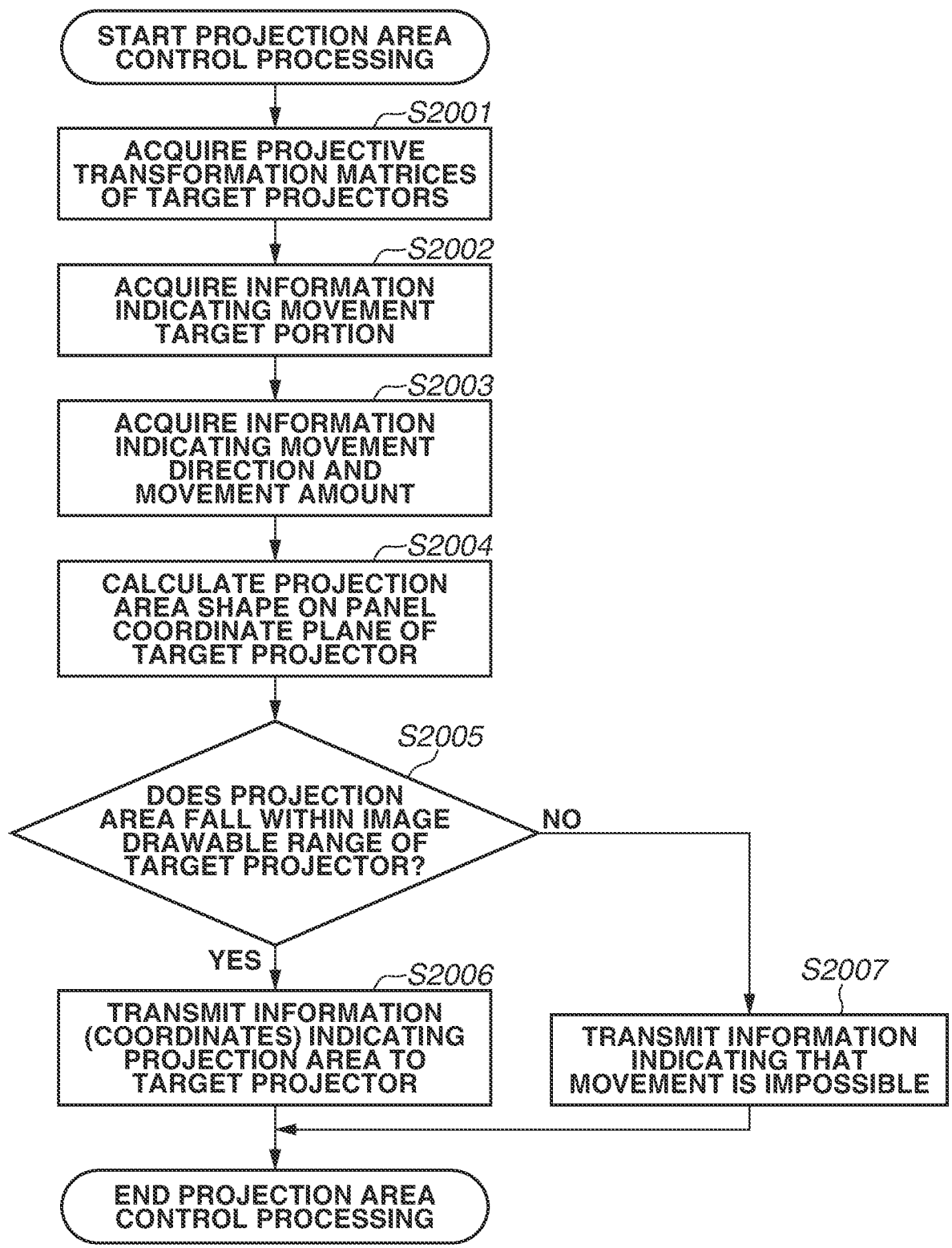
FIG. 20 is a flowchart illustrating a flow of movement control of a projection area of a target projector belonging to a control group.

FIG. 20 is a flowchart illustrating a flow of movement control on the projection area of a target projector belonging to the control group. The movement control flow is performed in response to an instruction for moving the projection area of a target projector belonging to the control group being received.

In step S2001, the area control unit 2010 acquires a projective transformation matrix of each target projector of the control group serving as a controlled object. The area control unit 2010 acquires a projective transformation matrix Ma for transformation from the panel coordinate plane of the projector 100*a* to the camera coordinate plane and a projective transformation matrix Mb for transformation from the panel coordinate plane of the projector 100*b* to the camera coordinate plane. Projective transformation matrices previously calculated by the processing in steps S801 to S804 performed in the automatic position adjustment flow illustrated in FIG. 8 are assumed to be used. Furthermore, at the timing in step S2001, processing equivalent to steps S801 to S804 can be performed again to acquire projective transformation matrices.

Figure 21A:
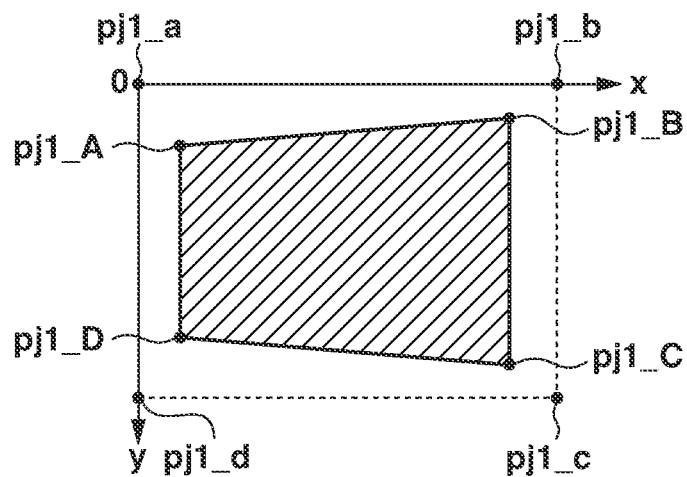
FIGS. 21A, 21B, and 21C are schematic diagrams illustrating a projection area in a camera coordinate plane and a projection area in a panel coordinate plane of each projector.
Figure 21B:
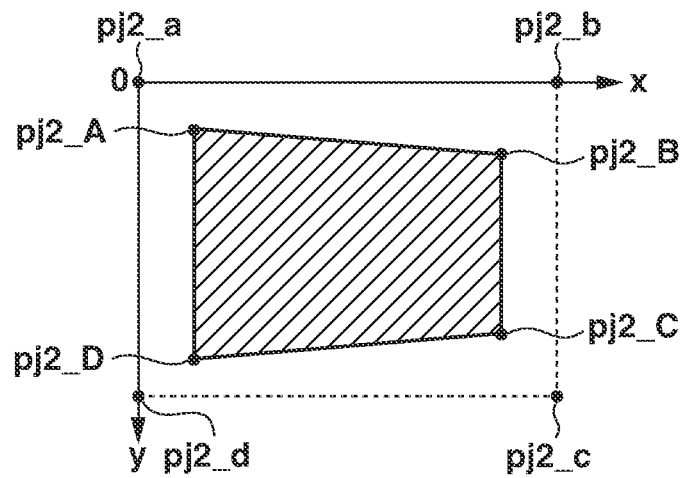
Figure 21C:
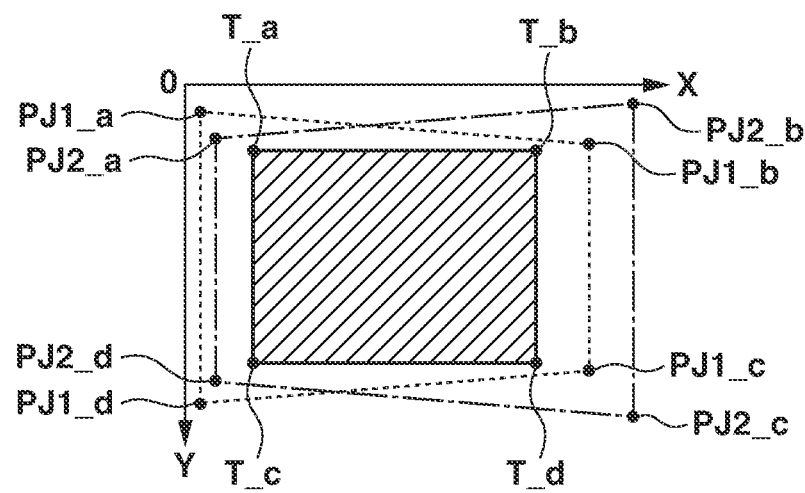

FIGS. 21A, 21B, and 21C are schematic diagrams illustrating a projection area in the camera coordinate plane and a projection area in the panel coordinate plane of each projector.

FIG. 21A is a schematic diagram illustrating the panel coordinate plane of the projector 100*a*. Points pj1_a, pj1_b, pj1_c, and pj1_d indicate vertices at four corners of a rectangle in which the projector 100*a* is able to draw an image. Moreover, points pj1_A, pj1_B, pj1_C, and pj1_D indicate vertices at four corners of the projection area of an image from the projector 100*a* which has been adjusted in step S808.

FIG. 21B is a schematic diagram illustrating the panel coordinate plane of the projector 100*b*. Points pj2_a, pj2_b, pj2_c, and pj2_d indicate vertices at four corners of a rectangle in which the projector 100*b* is able to draw an image. Moreover, points pj2_A, pj2_B, pj2_C, and pj2_D indicate vertices at four corners of the projection area of an image from the projector 100*b* which has been adjusted in step S808.

FIG. 21C illustrates an image projected by the projector 100a and the projector 100b on the projection surface. In other words, FIG. 21C illustrates a projection image in a camera image (camera coordinate plane) obtained by capturing an image of the projection surface.

Points PJ1_a, PJ1_b, PJ1_c, and PJ1_d indicate vertices at four corners of a rectangular area (image drawable range) in which the projector 100a is able to draw an image in the projection surface. The points pj1_a, pj1_b, pj1_c, and pj1_d illustrated in FIG. 21A correspond to the points PJ1_a, PJ1_b, PJ1_c, and PJ1_d illustrated in FIG. 21C, respectively. Here, the correspondence relationship (transformation matrix) between the point pj1_a and the point PJ1_a is a projective transformation matrix Ma previously acquired with respect to the projector 100a in steps S802 to S804 illustrated in FIG. 8.

Moreover, points PJ2_a, PJ2_b, PJ2_c, and PJ2_d indicate vertices at four corners of a rectangular area (image drawable range) in which the projector 100b is able to draw an image in the projection surface. The points pj2_a, pj2_b, pj2_c, and pj2_d illustrated in FIG. 21B correspond to the points PJ2_a, PJ2_b, PJ2_c, and PJ2_d illustrated in FIG. 21C, respectively. Here, the correspondence relationship (transformation matrix) between the point pj2_a and the point PJ2_a is a projective transformation matrix Mb previously acquired with respect to the projector 100b in steps S802 to S804 illustrated in FIG. 8.

Points T_a, T_b, T_c, and T_d indicate vertices at four corners of the projection area of each of the projectors 100a and 100b, which has been adjusted in step S808. The points T_a, T_b, T_c, and T_d correspond to the points pj1_A, pj1_B, pj1_C, and pj1_D illustrated in FIG. 21A, respectively. Here, the correspondence relationship (transformation matrix) between the point pj1_A and the point T_a is a projective transformation matrix Ma previously acquired with respect to the projector 100a in steps S802 to S804 illustrated in FIG. 8. Moreover, the points T_a, T_b, T_c, and T_d correspond to the points pj2_A, pj2_B, pj2_C, and pj2_D illustrated in FIG. 21B, respectively. Here, the correspondence relationship (transformation matrix) between the point pj2_A and the point T_a is a projective transformation matrix Mb previously acquired with respect to the projector 100b in steps S802 to S804 illustrated in FIG. 8.

In step S2002, the area control unit 2010 acquires information indicating a movement target portion in the projection area of the target projector. In the case of selecting a portion serving as a movement target with use of the GUI (selection buttons 685) illustrated in FIG. 19, the area control unit 2010 acquires information indicating, as the movement target portion, any one of the vertices at four corners and the four sides of the projection area and the entire projection area. Here, as mentioned above, the upper right corner (T_b) of the projection area is assumed to be the movement target portion.

In step S2003, the area control unit 2010 acquires information indicating the direction (movement direction) in which and the amount (movement amount) by which to move the movement target portion of the projection area of the target projector. As mentioned above, an instruction to move the movement target portion to the right by one pixel on the camera coordinate plane is assumed to have been issued. The coordinates on the camera coordinate plane of the moved upper right corner are assumed to be a point T_b'.

In step S2004, the area control unit 2010 acquires coordinates of the projection area on the panel plane of each target projector corresponding to the coordinates (T_a, T_b', T_c, T_d) of the moved projection area on the camera coordinate plane. The area control unit 2010 calculates a point pj1_B' corresponding to the point T_b' on the panel coordinate plane of the projector 100a with use of an inverse matrix of the projective transformation matrix Ma. Moreover, the area control unit 2010 calculates a point pj2_B' corresponding to the point T_b' on the panel coordinate plane of the projector 100b with use of an inverse matrix of the projective transformation matrix Mb.

Figure 22A:
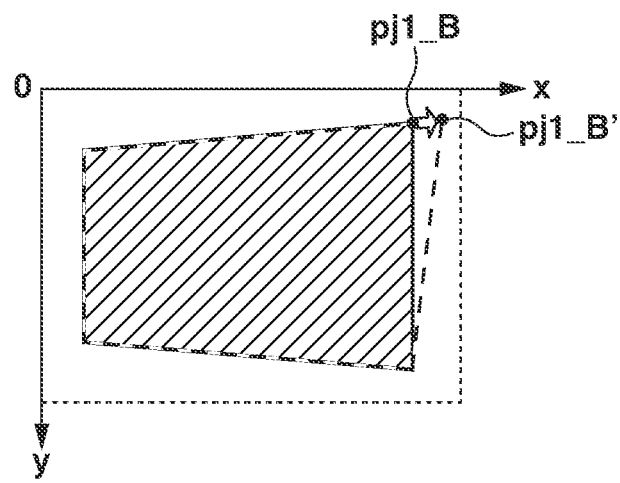
FIGS. 22A, 22B, and 22C are schematic diagrams illustrating projection areas obtained before and after movement control processing in the camera coordinate plane and the panel coordinate plane.
Figure 22B:
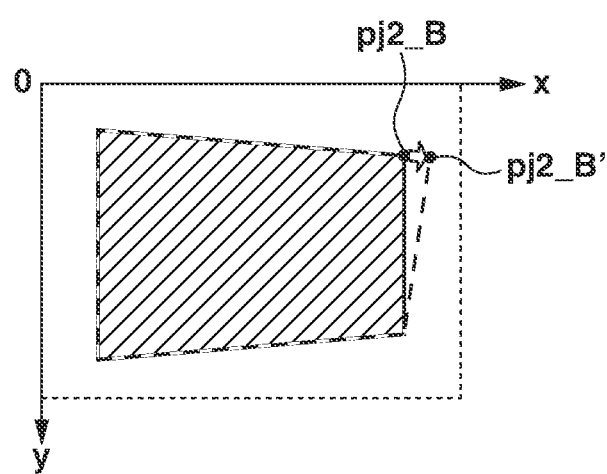
Figure 22C:
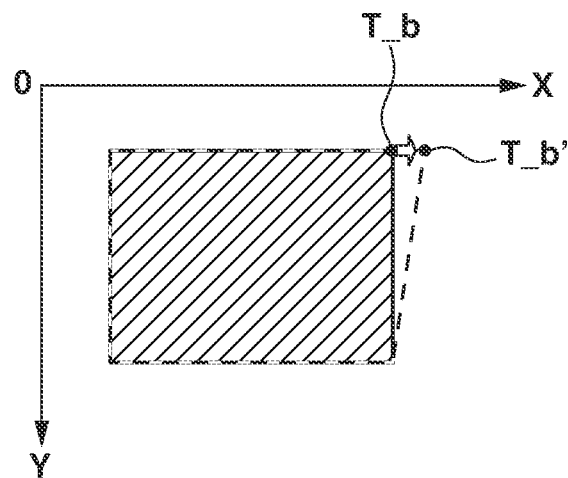

FIGS. 22A, 22B, and 22C are schematic diagrams illustrating projection areas obtained before and after the movement control processing in the panel coordinate planes of the projector 100a and the projector 100b and the camera coordinate plane. FIG. 22A is a schematic diagram illustrating projection areas obtained before and after the movement control processing in the panel coordinates of the projector 100a. FIG. 22B is a schematic diagram illustrating projection areas obtained before and after the movement control processing in the panel coordinates of the projector 100b. FIG. 22C is a schematic diagram illustrating projection areas obtained before and after the movement control processing in the camera coordinates. In FIGS. 22A to 22C, unlike FIGS. 21A to 21C, for illustrative purposes, only the vertices corresponding to the upper right corner (T_b) of the projection area serving as a movement target portion are assigned the reference characters.

Suppose that, as illustrated in FIG. 22C, the upper right corner (T_b) of the projection area moves to the right by a predetermined amount (a distance equivalent to one pixel) and then reaches coordinates T_b'. At this time, the point pj1_B' calculated by the area control unit 2010 is equivalent to such a position as illustrated in FIG. 22A. As illustrated in FIG. 22A, the movement direction in the panel coordinate plane does not necessarily coincide with the movement direction (rightward) in the camera coordinates. Moreover, similarly, the movement amount (pj1_B-pj1_B') in the panel coordinate plane does not necessarily coincide with the movement amount (T_b-T_b') in the camera coordinates.

Moreover, the point pj2_B' calculated by the area control unit 2010 is equivalent to such a position as illustrated in FIG. 22B. As illustrated in FIG. 22B, the movement direction in the panel coordinate plane does not necessarily coincide with the movement direction (rightward) in the camera coordinates. Moreover, similarly, the movement amount (pj2_B-pj2_B') in the panel coordinate plane does not necessarily coincide with the movement amount (T_b-T_b') in the camera coordinates.

Moreover, the projection areas in the respective target projectors obtained after the movement control processing become dashed-line areas illustrated in FIGS. 22A and 22B.

In step S2005, the area control unit 2010 determines whether the calculated projection area of each target projector falls within a range in which each target projector is able to draw an image (image drawable range). In other words, the area control unit 2010 determines whether the designated movement of the projection area is able to be performed.

For example, in a case where the upper right corner (pj1_B') of the projection area of the projector 100a calculated in step S2004 is located on the outer side of the upper right corner (pj1_b) of the image drawable range, the area control unit 2010 determines that the calculated projection area does not fall within the image drawable range.

If, in step S2005, it is determined that the calculated projection area of each target projector falls within the image drawable range of each target projector (YES in step S2005), the processing proceeds to step S2006. If not so (NO in step S2005), the processing proceeds to step S2007.

In step S2006, the area control unit 2010 transmits information indicating the calculated projection area to each target projector. Furthermore, in a case where each target projector deforms the projection area on previously set lattice points, the area control unit 2010 can transmit information indicating lattice points corresponding to the shape of the calculated projection area. Furthermore, in a case where the calculated projection area is not present on lattice points, the area control unit 2010 can perform control such that the projection area is associated with nearby lattice points.

In step S2007, the area control unit 2010 displays a GUI for transmitting information indicating that the movement designated by the instruction is impossible to the user. In step S2007, the area control unit 2010 does not perform deformation processing for the projection area associated with the instruction for movement.

With the above processing in step S2006 or S2007 performed, the control processing for the projection area ends.

Furthermore, while, in the above description, the control processing for the projection area is performed in response to the user clicking a cursor button of the movement instruction button 686, the present exemplary embodiment is not limited to this. For example, in a case where the GUI 680 includes a movement execution button, an instruction for movement can be output in response to the user previously designating a movement target portion, a movement direction, and a movement amount and then pressing the movement execution button.

In the above-described way, projection images projected by target projectors belonging to the selected control group are controlled to be moved together in the direction designated by an instruction on the screen. Moreover, projection images projected by target projectors belonging to the selected control group are controlled to be moved together by substantially the same amount in the direction designated by an instruction on the screen. Accordingly, the user does not need to individually adjust the target projectors belonging to a control group.

Furthermore, while, in the above example, the movement target portion is assumed to be the upper right vertex of the projection area, the movement target portion is not limited to this. The entire projection area can be selected as the movement target portion, or a plurality of vertices of the projection area can be simultaneously selected. Selecting a side is equivalent to selecting two vertices corresponding to the selected side. Selecting the entire projection area is equivalent to selecting all of the four vertices thereof. In any case, transforming the coordinates of four vertices obtained after movement on the camera coordinate plane into coordinates on the panel coordinate plane with use of a projective transformation matrix of each target projector enables performing control similar to the above-described processing.

Furthermore, while, in the above example, a cursor button is used to designate the movement direction and the movement amount and transmit a movement instruction, a similar instruction can be issued by the user directly designating coordinates on a camera image displayed in the display region.

Figure 23:
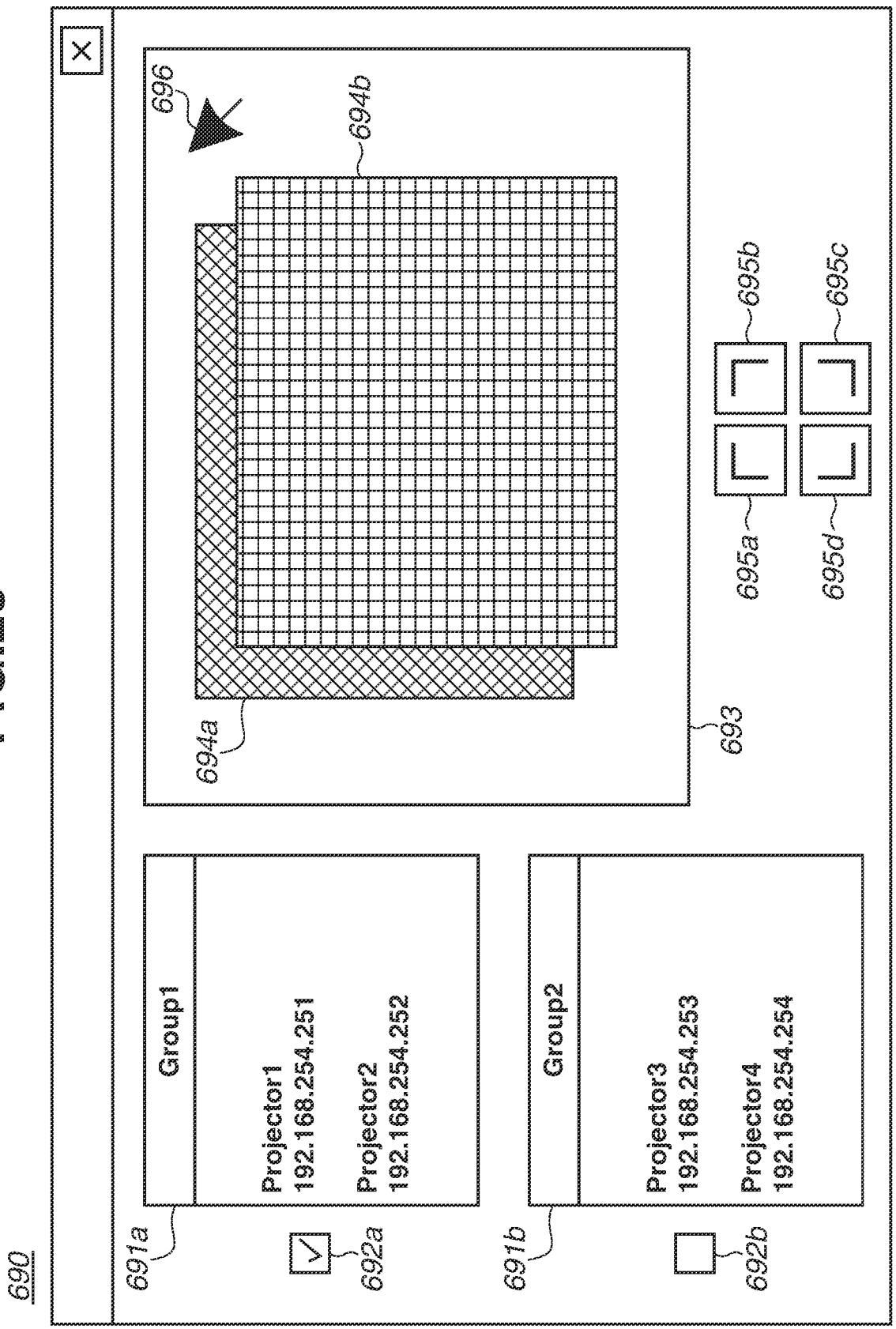
FIG. 23 is a ninth schematic diagram illustrating a GUI which is displayed on the display unit.

FIG. 23 is a schematic diagram illustrating a GUI 690, which enables the user to issue a movement instruction for the movement target portion with respect to the display region. The user selects movement destination coordinates with use of a movement instruction cursor 696. As movement source coordinates, the upper left, upper right, lower right, and lower left corners can be selected by selecting selection buttons 695a, 695b, 695c, and 695d, respectively. The GUI 690 can be configured to be switchable to the GUI 680 illustrated in FIG. 19.

After the command is transmitted in step S910 illustrated in FIG. 11, the processing returns to step S907, and then continues until the user selects ending the adjustment processing.

In the above-described way, the setting processing for control groups and the adjustment processing for the projection area with respect to a control group are completed.

According to control performed in the present exemplary embodiment, in a projection system which displays one image by combining images projected by a plurality of projection apparatuses on a projection surface, it is possible to collectively adjust projection areas of projection apparatuses the projection areas of which satisfy a predetermined relationship. Accordingly, it becomes possible to prevent or reduce breaking a relationship between projection areas of projection apparatuses in which the sufficient position adjustment of projection areas has been previously performed, and to reduce the user's trouble for adjustment of the projection area.

Figure 15:
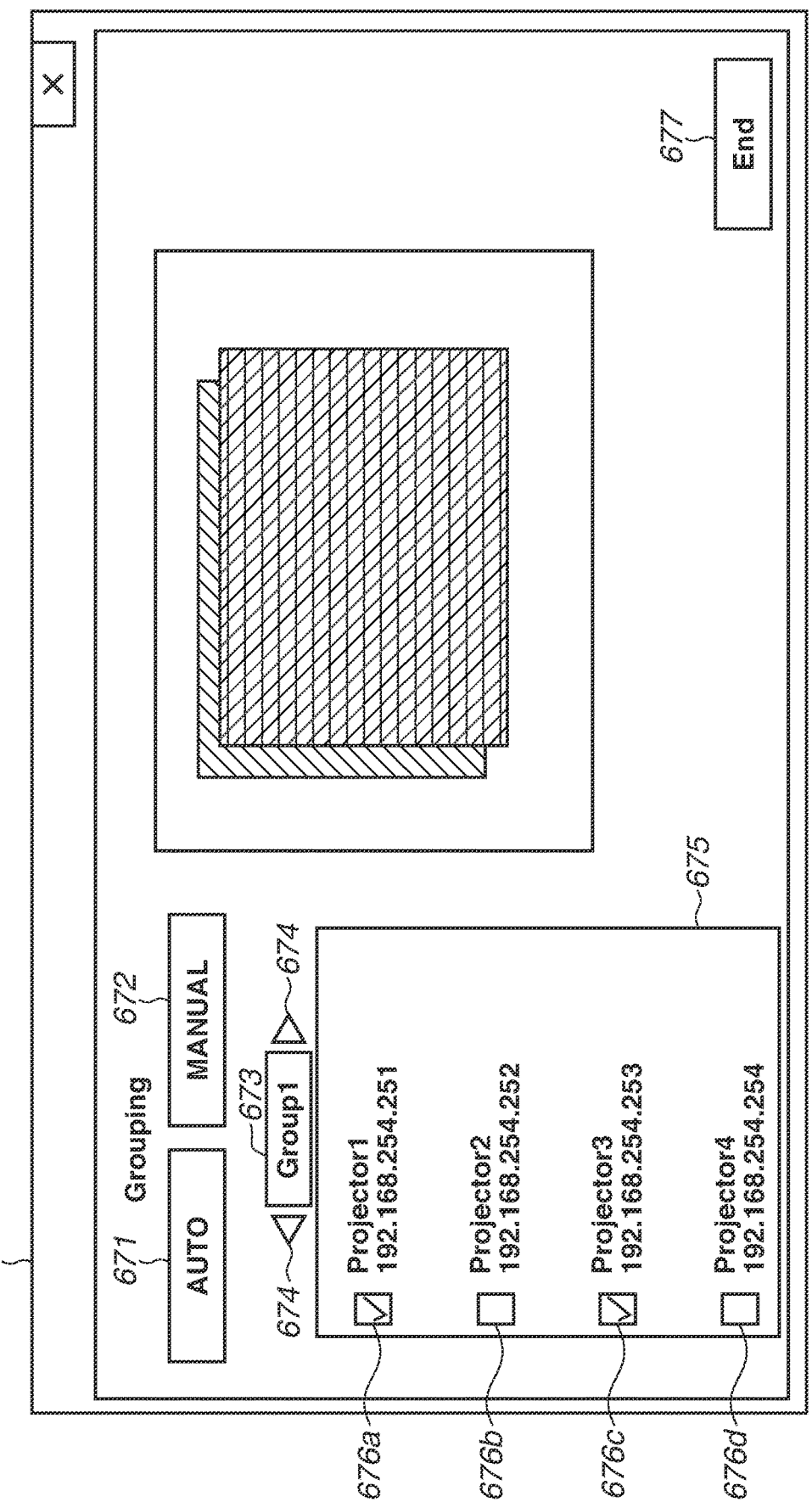
FIG. 15 is a seventh schematic diagram illustrating a GUI which is displayed on the display unit.

Furthermore, setting of control groups can be manually performed by the user. FIG. 15 is a schematic diagram illustrating a GUI 670, which is displayed on the display unit 205 so as to issue an instruction to perform setting processing for control groups. The GUI 670 includes an automatic setting button 671, a manual setting button 672, a setting target display region 673, selection buttons 674, a target projector selection region 675, checkboxes 676 (676a, 676b, 676c, and 676d), and an end button 677.

The automatic setting button 671 is a button used to issue an instruction to the setting unit 2013 to perform automatic control group setting processing, which determines a control group based on captured images with the above-described processing illustrated in FIG. 11. The manual setting button 672 is a button used to issue an instruction to the setting unit 2013 to perform manual control group setting processing, in which the user sets target projectors belonging to a control group, as described below. The user presses the automatic setting button 671 or the manual setting button 672 displayed on the display unit 205 via the operation unit 204, thus inputting an instruction for a setting method to the mode selection unit 2012. The mode selection unit 2012 sets the setting method corresponding to the input instruction to the setting unit 2013. In a case where the user has selected the automatic control group setting processing, the above-described setting processing for control groups illustrated in FIG. 11 is performed.

In a case where the user has selected the manual control group setting processing, the user operates the GUI 670 to manually set a control group. The setting target display region 673 is a region in which to display an image indicating a control group targeted for setting. The selection buttons 674 are buttons respectively provided for the rightward and leftward directions and used to switch a control group indicated in the setting target display region 673, i.e., a control group targeted for setting. For example, pressing the right-hand selection button 674 causes the control group targeted for setting to advance from the control group 1 (Group1) to the control group 2 (Group2).

The target projector selection region 675 is a region in which to display, in a list form, information indicating target projectors so as to allow the user to select a target projector belonging to the control group targeted for setting. In the GUI 670, as the information indicating target projectors, projector names (for example, Projector1 and Projector2)

and IP addresses of the target projectors 100a to 100d are indicated. Each checkbox 676 is a box used to issue an instruction as to whether to bring a target projector into the control group targeted for setting. The state of a checkbox 676 being checked indicates that the corresponding target projector belongs to the control group targeted for setting. The GUI 670 illustrated in FIG. 15 indicates that the target projectors (Projector1 and Projector3) the checkboxes 676 of which are checked belong to the control group targeted for setting (Group1). The end button 677 is a button used to input an instruction to end the setting processing for control groups.

Furthermore, after the automatic control group setting processing is performed once, the GUI 670 can be displayed and the control group can be manually modified by the user. Since manual setting for control groups is made selectable as described above, it becomes possible for the user to readily set a control group based on a result of visual confirmation of a relationship between projection areas of target projectors. Moreover, it becomes easy for the user to modify a control group which has been automatically set. Moreover, in response to an instruction for manual setting being issued, a new control group different from the control group generated by automatic setting can also be generated.

Figure 16A:
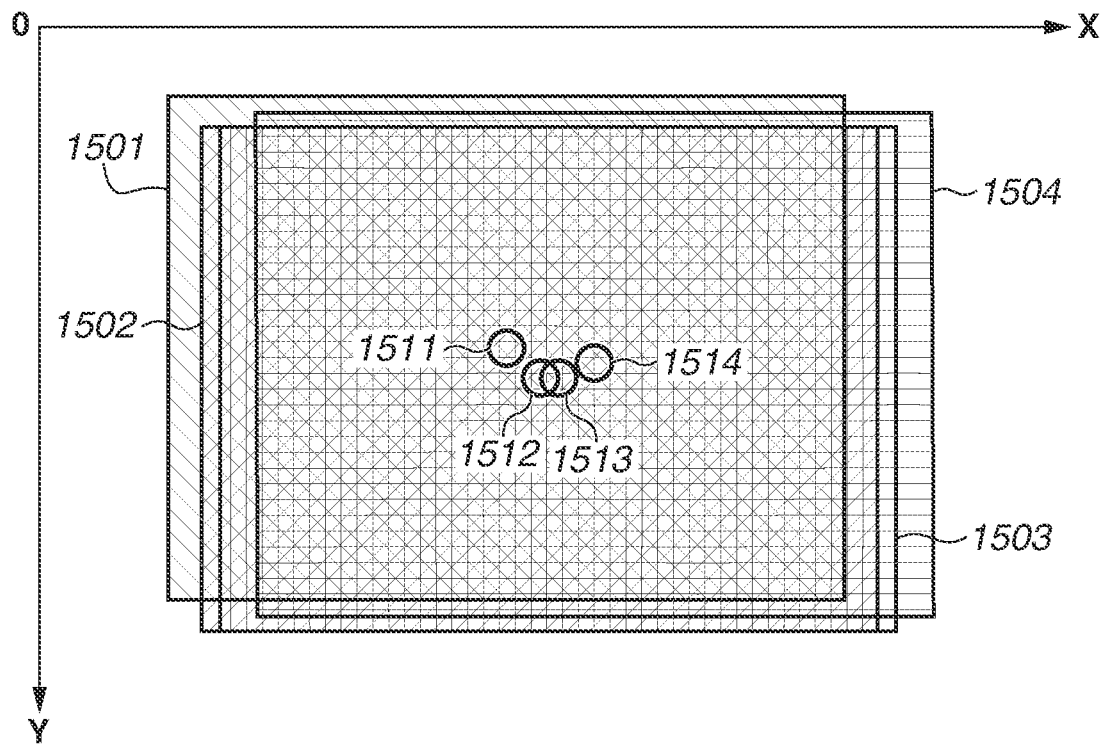
FIGS. 16A and 16B are schematic diagrams each illustrating a distance between centers of the projection areas of the respective target projectors.
Figure 16B:
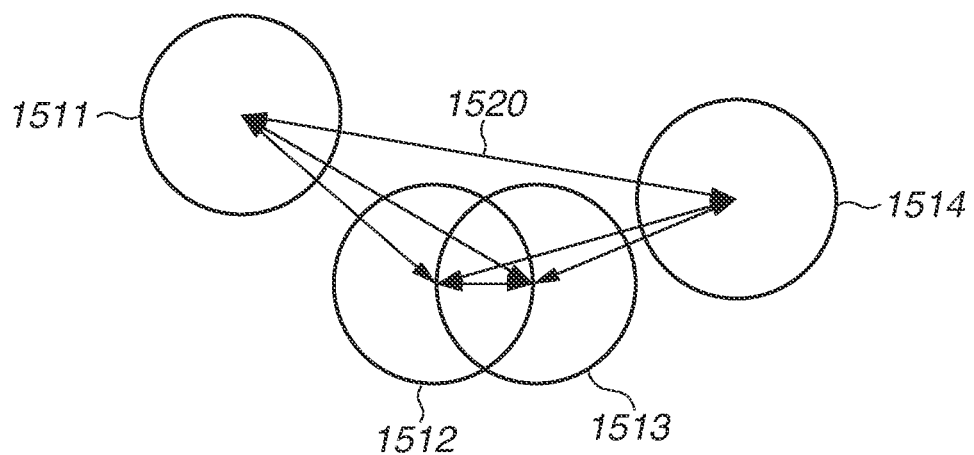

Furthermore, while, in the above-described setting processing for control groups, a control group is set based on the degree of superposition of projection areas of the respective target projectors, a control group can be determined with use of a distance between centers of projection areas of the respective target projectors. FIGS. 16A and 16B are schematic diagrams illustrating distances between centers of projection areas of the respective target projectors.

FIG. 16A is a schematic diagram illustrating projection areas of the respective target projectors being superposed on each other on the projection surface 500 after the position adjustment processing. Areas 1501 to 1504 represent the projection areas of the target projectors 100a to 100d, respectively. Moreover, coordinates 1511 to 1514 represent central coordinates of the projection areas 1501 to 1504, respectively. FIG. 16B is a schematic diagram illustrating relative positions of the central coordinates of the respective projection areas.

In step S905 illustrated in FIG. 11, the setting unit 2013 calculates the central coordinates 1511 to 1514 in conjunction with the superposition area calculation for the projectors performed in step S904. For example, the setting unit 2013 sets an intersection point of diagonal lines of a projection area of the captured image as central coordinates. The setting unit 2013 calculates a distance between central coordinates of the respective target projectors. A line segment 1520 illustrated in FIG. 16B represents a distance between the central coordinates 1511 and 1514, and, similarly, distances between the respective points are calculated.

FIG. 17 is a table showing the superposition degree (group index) between the respective target projectors and the distance between central coordinates of the respective projection areas. As mentioned above, in a case where control groups are determined based on only the group index, the threshold value is assumed to be 0.9. In this case, a combination of the projector 100b and the projector 100c, a combination of the projector 100b and the projector 100d, and a combination of the projector 100c and the projector 100d are determined to belong to the respective same control groups. Thus, the projector 100b, the projector 100c, and the projector 100d are set to belong to the same control group. If, as a criterion for determining control groups, the distance between central coordinates is defined to be less than 5, a relationship between the projector 100b and the projector 100d and a relationship between the projector 100c and the projector 100d become inapplicable. Accordingly, the setting unit 2013 sets the projector 100a as a control group 1, sets the projector 100b and the projector 100c as the same control group (control group 2), and sets the projector 100d as a control group 3.

A projection control apparatus according to an exemplary embodiment of the present disclosure groups projection apparatuses the projection areas of which satisfy a predetermined relationship out of a plurality of projection apparatuses, thus enabling preventing or reducing expansion of deviation of projection positions caused by adjustment work and then enabling the user to readily adjust the projection positions of a plurality of projection apparatuses. Moreover, an exemplary embodiment of the present disclosure can be configured as a projection system including the above-described projection control apparatus and a plurality of projection apparatuses.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more processors, memories, circuitry (e.g., application specific integrated circuit (ASIC)), or a combination thereof, for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more processors, memories, circuitry, or a combination thereof, to perform the functions of one or more of the above-described embodiment(s). The computerized configuration(s) may comprise one or more processors, one or more memories, circuitry (e.g., central processing unit (CPU), micro processing unit (MPU)), or a combination thereof, and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2018-100072 filed May 24, 2018 and No. 2019-033294 filed Feb. 26, 2019, which are hereby incorporated by reference herein in their entirety.

What is claimed is:

1. A control apparatus for controlling projection apparatuses each of which projects an image onto a projection surface, the control apparatus comprising:
    an acquisition unit configured to acquire a captured image obtained by capturing an image of an area including an image projected by each projection apparatus on the projection surface;
    a setting unit configured to set a control group including two or more projection apparatuses, projection areas of which satisfy a predetermined relationship, based on the captured image acquired by the acquisition unit;
    a reception unit configured to receive a user instruction relating to moving projection areas of the two or more projection apparatuses included in the control group in the projection surface; and
    a control unit configured to, in response to the user instruction, control the two or more projection apparatuses included in the control group in such a way as to move the projection areas of the two or more apparatuses in a direction corresponding to the user instruction.

2. The control apparatus according to claim 1, wherein the control unit controls, in response to the user instruction, the two or more projection apparatuses included in the control group in such a way as to move the projection areas of the two or more projection apparatuses together in the direction corresponding to the user instruction.

3. The control apparatus according to claim 1, wherein the control unit transmits a parameter for geometric correction to a projection apparatus targeted for control to control a shape of a projection area of the projection apparatus targeted for control.

4. The control apparatus according to claim 1, wherein the setting unit sets two or more projection apparatuses in which a ratio of an area in which projection areas thereof are superposed on each other on the projection surface is greater than or equal to a first threshold value as belonging to the control group.

5. The control apparatus according to claim 1, wherein the setting unit sets two or more projection apparatuses corresponding to two or more projection areas in which a distance between centers of projection areas on the projection surface is less than a second threshold value as belonging to the control group.

6. The control apparatus according to claim 1, further comprising a first selection unit configured to select, according to an input from a user, one of a plurality of setting modes including a first setting mode, which sets two or more projection apparatuses projection areas of which satisfy a predetermined relationship based on an acquired position of a projection area of each projection apparatus as the control group, and a second setting mode, which sets two or more projection apparatuses selected by a user as the control group,
    wherein the setting unit sets the control group according to the setting mode selected by the first selection unit.

7. The control apparatus according to claim 1, further comprising a second selection unit configured to, in a case where the setting unit has set two or more control groups each corresponding to the control group, select a control group which the control unit targets for controlling a projection area, according to an input from a user,
    wherein the control unit controls a projection area of a projection apparatus belonging to the control group selected by the second selection unit.

8. The control apparatus according to claim 1, wherein the setting unit selects the two or more projection apparatuses belonging to the control group according to an input from a user.

9. The control apparatus according to claim 1, further comprising a display control unit configured to display, on a display unit, information about the projection areas of the projection apparatuses,
    wherein the display control unit displays, on the display unit, the control group set by the setting unit and the projection apparatuses belonging to the control group in a discriminable manner.

10. A projection system comprising:
    the control apparatus according to claim 1; and
    the projection apparatuses.

11. The control apparatus according to claim 1, wherein the user instruction is an instruction for a direction in which to move projection areas of the two or more projection apparatuses included in the control group in the projection surface.

12. A control method for projection apparatuses each of which projects an image onto a projection surface, the control method comprising:
    acquiring a captured image obtained by capturing an image of an area including an image projected by each projection apparatus on the projection surface;
    setting a control group including two or more projection apparatuses, projection areas of which satisfy a predetermined relationship, based on the captured image acquired by the acquiring;
    receiving a user instruction relating to moving projection areas of the two or more projection apparatuses included in the control group in the projection surface; and
    controlling, in response to the user instruction, the two or more projection apparatuses included in the control group in such a way as to move the projection areas of the two or more projection apparatuses in a direction corresponding to the user instruction.

13. The control method according to claim 12, further comprising controlling, in response to the user instruction, the two or more projection apparatuses included in the control group in such a way as to move the projection areas of the two or more projection apparatuses together in the direction corresponding to the user instruction.

14. The control method according to claim 12, further comprising transmitting a parameter for geometric correction to a projection apparatus targeted for control to control a shape of a projection area of the projection apparatus targeted for control.

15. The control method according to claim 12, further comprising setting two or more projection apparatuses in which a ratio of an area in which projection areas thereof are superposed on each other on the projection surface is greater than or equal to a first threshold value as belonging to the control group.

16. The control method according to claim 12, further comprising setting two or more projection apparatuses corresponding to two or more projection areas in which a distance between centers of projection areas on the projection surface is less than a second threshold value as belonging to the control group.

17. The control method according to claim 12, further comprising:
selecting, according to an input from a user, one of a plurality of setting modes including a first setting mode, which sets two or more projection apparatuses projection areas of which satisfy a predetermined relationship based on an acquired position of a projection area of each projection apparatus as the control group, and a second setting mode, which sets two or more projection apparatuses selected by a user as the control group; and
setting the control group according to the selected setting mode.

18. The control method according to claim 12, further comprising:
selecting, in a case where two or more control groups each corresponding to the control group have been set, a control group targeted for controlling a projection area, according to an input from a user; and
controlling a projection area of a projection apparatus belonging to the selected control group.

19. The control method according to claim 12, further comprising selecting the two or more projection apparatuses belonging to the control group according to an input from a user.

20. The control method according to claim 12, further comprising:
displaying, on a display unit, information about the projection areas of the projection apparatuses; and
displaying, on the display unit, the set control group and the projection apparatuses belonging to the control group in a discriminable manner.

21. The control method according to claim 12, wherein the user instruction is an instruction for a direction in which to move projection areas of the two or more projection apparatuses included in the control group in the projection surface.

22. A non-transitory computer-readable storage medium storing computer-executable instructions that, when executed by a computer, cause the computer to perform a control method for projection apparatuses each of which projects an image onto a projection surface, the control method comprising:
acquiring a captured image obtained by capturing an image of an area including an image projected by each projection apparatus on the projection surface;
setting a control group including two or more projection apparatuses, projection areas of which satisfy a predetermined relationship, based on the captured image acquired by the acquiring;
receiving a user instruction relating to moving projection areas of the two or more projection apparatuses included in the control group in the projection surface; and
controlling, in response to the user instruction, the two or more projection apparatuses included in the control group in such a way as to move the projection areas of the two or more projection apparatuses in a direction corresponding to the user instruction.

23. A control apparatus for controlling projection apparatuses each of which projects an image onto a projection surface, the control apparatus comprising:
an acquisition unit configured to acquire a captured image obtained by capturing an image of an area including an image projected by each projection apparatus on the projection surface; and
a setting unit configured to set a control group including two or more projection apparatuses, projection areas of which satisfy a predetermined relationship, based on the captured image acquired by the acquisition unit.

24. A control method for controlling projection apparatuses each of which projects an image onto a projection surface, the control apparatus comprising:
acquiring a captured image obtained by capturing an image of an area including an image projected by each projection apparatus on the projection surface; and
setting a control group including two or more projection apparatuses, projection areas of which satisfy a predetermined relationship, based on the captured image acquired by the acquiring.

* * * * *